(12) United States Patent
Grother et al.

(10) Patent No.: US 12,497,050 B2
(45) Date of Patent: Dec. 16, 2025

(54) SURFACE PROFILE MEASURING APPARATUS AND METHOD HAVING NO MINIMUM SPEED REQUIREMENT

(71) Applicant: Surface Systems and Instruments, Inc., Larkspur, CA (US)

(72) Inventors: Ethan M. Grother, Manhattan, KS (US); Brent L. Bergman, Manhattan, KS (US); Dennis P. Scott, Larkspur, CA (US)

(73) Assignee: Surface Systems and Instruments, Inc., Larkspur, CA (US)

( * ) Notice: Subject to any disclaimer, the term of this patent is extended or adjusted under 35 U.S.C. 154(b) by 21 days.

(21) Appl. No.: 18/505,471

(22) Filed: Nov. 9, 2023

(65) Prior Publication Data

US 2024/0067181 A1 Feb. 29, 2024

Related U.S. Application Data

(63) Continuation of application No. 17/014,626, filed on Sep. 8, 2020, now Pat. No. 11,858,516.

(60) Provisional application No. 62/897,521, filed on Sep. 9, 2019.

(51) Int. Cl.
*B60W 40/076* (2012.01)
*B60W 30/14* (2006.01)
*B60W 40/11* (2012.01)
*B60W 50/00* (2006.01)

(52) U.S. Cl.
CPC ........ *B60W 40/076* (2013.01); *B60W 30/143* (2013.01); *B60W 40/11* (2013.01); *B60W 2050/0052* (2013.01); *B60W 2050/0075* (2013.01); *B60W 2420/408* (2024.01); *B60W 2520/16* (2013.01); *B60W 2552/15* (2020.02); *B60W 2556/05* (2020.02); *B60W 2556/45* (2020.02); *B60W 2556/50* (2020.02)

(58) Field of Classification Search
CPC .................................................... B60W 40/076
See application file for complete search history.

(56) References Cited

U.S. PATENT DOCUMENTS

| | | |
|---|---|---|
| 4,741,207 A | 5/1988 | Spangler |
| 5,774,374 A | 6/1998 | Scott et al. |
| 6,775,914 B2 | 8/2004 | Toom |
| | (Continued) | |

OTHER PUBLICATIONS

Liu et al., "A Kalman-Filter Based Multi-Sensor Terrain Profile Measurement System: Principle, Implementation and Validation", Proc. of SPIE vol. 6965 696501-1, 2008, 9 pages.

(Continued)

*Primary Examiner* — Michael A Berns
(74) *Attorney, Agent, or Firm* — Beyer Law Group LLP

(57) ABSTRACT

A profiler arranged to be used on a host vehicle. The profiler is capable of (a) receiving data collected by the profiler while traveling over a surface and (b) generating a surface profile using the data collected with no minimum speed requirement. Since there is no minimum speed requirement, the profiler is capable of generating valid, repeatable and reliable road surface profiles in situations not previously possible, such as during a stop, during acceleration of the host vehicle, during deceleration of the host vehicle, or while the host vehicle is traveling at very low speeds below thresholds typically required for prior profilers.

26 Claims, 14 Drawing Sheets

(56) References Cited

U.S. PATENT DOCUMENTS

| | | | |
|---|---|---|---|
| 7,044,680 | B2 | 5/2006 | Godbersen et al. |
| 8,352,188 | B2 | 1/2013 | Scott et al. |
| 8,352,189 | B2 | 1/2013 | Scott et al. |
| 9,404,738 | B2 | 8/2016 | Toom |
| 9,786,182 | B2 * | 10/2017 | Calmettes ............ G05D 1/0293 |
| 10,101,454 | B2 * | 10/2018 | Pearlman ................ G01S 17/42 |
| 10,690,774 | B2 * | 6/2020 | Pearlman ................ G01S 17/42 |
| 11,858,516 | B2 * | 1/2024 | Grother ............... B60W 40/076 |
| 2021/0070305 | A1 | 3/2021 | Grother et al. |
| 2024/0067181 | A1 * | 2/2024 | Grother ............... B60W 40/076 |

OTHER PUBLICATIONS

Karamihas et al., "Measuring, Characterizing, and Reporting Pavement Roughness of Low-Speed and Urban Roads", 2019, http://nap.nationalacademies.org/25563, 167 Pages.

Walker et al., "Collecting Stop and Go Inertial Profile Measurements", The University of Texas at Arlington Transportation Instrumentation Laboratory, 52 pages, May 2006.

Guo et al., "Development and Preliminary Evaluation of a Varying-Speed Road Profiler", www.astm.org, vol. 48, No. 5, 11 pages, Mar. 27, 2019.

Karamihas, "Sensitivity of Inertial Profilers to Operational Conditions on Urban and Low-Speed Roadways", University of Michigan Transportation Research Institute, 33 pages, Sep. 17-20, 2019.

Peretroukhine et al., "On Low Speed Problem in Road Smoothness Profiling", www.fugro.com, 12 pages, Sep. 28, 2011.

Karamihas et al., "Measuring, Characterizing, and Reporting Pavement Roughness of Low-Speed and Urban Roads", http://nap.edu/25563, 167 pages, 2019.

Huft, "Improvement of Profile Measurement Quality", SD Department of Transportation, Road Profiler User Group, 8 pages, Nov. 15, 2017.

Dynatest Brochure, Road Surface Profiler (RSP) Mark III, www.dynatest.com, 2 pages, 2016-2017.

Fernando, Technical Memorandum, "Investigation of Ride Quality Measurement Errors under Stop & Go Driving Conditions", Texas A & M Transportation Institute, 19 pages, Apr. 22, 2020.

ASTM International, "Standard Test Method for Measuring the Longitudinal Profile of Traveled Surfaces"; Apr. 2, 2015, Designation: E950-22, pp. 1-9.

ASTM International, "Standard Test Method for Measuring the Longitudinal Profile of Traveled Surfaces with an Accelerometer-Established Inertial Profiling Reference"; Nov. 5, 2018, Designation E950/E950M-09, pp. 1-6.

American Association of State Highway and Transportation Officials, "Standard Specification for Inertial Profiler", AASHTO Designation: M 328-10, 2010.

Sayers et al., "The Little Book of Profiling: Basic Information about Measuring and Interpreting Road Profiles"; University of Michigan, Sep. 1998, p. 1-100.

"Permanent Pedestrian Facilities", ADA Compliance Handbook, State of California, Department of Transportation, Division of Construction, Mar. 2018, 43 pages.

Starodub, Inc., "Ultra-Light Inertial Profiler (ULIP) for Sidewalks", https://www.corada.com/products/starodub-inc-ultra-light-inertial-profiler-ulip-for-sidewalks, webpage that was available prior to the priority date of the present application, downloaded from the internet on May 31, 2023.

SSI, Surface Systems and Instruments, CS8900 Access Profiler brochure, 2013, 2 pages.

SSI, Surface Systems and Instruments, CS8600 Ultralight Profiler brochure, 2016, 2 pages.

Wikipedia, "Integral", https://en.wikipedia.org/wiki/Integral, available as early as Jan. 23, 2002, downloaded from the internet on Jul. 18, 2023.

ASTM International, "Standard Test Method for Using a Rolling Inclinometer to Measure Longitudinal and Transverse profiles of a Traveled Surface", available from the Transportation Research Board, Mar. 2003, 4 pages.

Wikipedia, "Grade (slope)", https://en.wikipedia.org/wiki/Grade_(slope), available as early as Jul. 3, 2003, downloaded from the internet on Jun. 14, 2023.

Wikipedia, "Riemann sum", https://en.wikipedia.org/wiki/Riemann_sum, available as early as Jan. 30, 2003, downloaded from the internet on Jul. 18, 2023.

International Cyberkinetics, "IrisPRO Inertial Profiler", https://www.internationalcybernetics.com/inertial-profilers/, webpage of a product believed to be available prior to the priority date of the present application, downloaded from the internet on Jul. 18, 2023.

ARRB Systems, "Hawkeye 2000", https://arrbsystems.com/solution/hawkeye-2000/, webpage of a product believed to be available prior to the priority date of the present application, downloaded from the internet on Jul. 18, 2023.

Ames Engineering, "6300 Lightweight Profiler", https://amesengineering.com/products/6300-lightweight-profiler/, webpage of a product believed to be available prior to the priority date of the present application, downloaded from the internet on Jul. 19, 2023.

Ames Engineering, "8300 High Speed Inertial Road profiler", https://amesengineering.com/products/8300-high-speed-profiler/, webpage of a product believed to be available prior to the priority date of the present application, downloaded from the internet on Jul. 19, 2023.

Dynatest, "RSP MK III, Road Surface Profilometer MK III", https://dynatest.com/equipment/road-surface-profiler-3/, webpage of a product believed to be available prior to the priority date of the present application, downloaded from the internet on Jul. 20, 2023.

Dynatest, "Road Surface Profilometer MK IV", https://dynatest.com/equipment/road-surface-profiler-4/, webpage of a product believed to be available prior to the priority date of the present application, downloaded from the internet on Jul. 20, 2023.

Surface Systems and Instruments, Inc., "CS8800 Walking Profiler", https://www.smoothroad.com/equipment/walking-profilers/cs8800-walking-profiler/, webpage of a product believed to be available prior to the priority date of the present application, downloaded from the internet on Jul. 19, 2023.

International Cyberkinetics, "SurPRO", https://www.internationalcybernetics.com/surpro/, webpage of a product believed to be available prior to the priority date of the present application, downloaded from the internet on Jul. 19, 2023.

ARRB Systems, "Walking Profiler G3", https://arrbsystems.com/fact-sheet/walking-profiler-g3/, webpage of a product believed to be available prior to the priority date of the present application, downloaded from the internet on Jul. 19, 2023.

Surface Systems and Instruments, Inc., "CS8700 lightweight Profiler", https://www.smoothroad.com/equipment/inertial-profilers/cs8700-lightweight-profiler/, webpage of a product believed to be available prior to the priority date of the present application, downloaded from the internet on Jul. 20, 2023.

Surface Systems and Instruments, Inc., "CS9100 Mid-Mount Inertial Profiler", https://www.smoothroad.com/equipment/inertial-profilers/cs9100-mid-mount-inertial-profiler/, webpage of a product believed to be available prior to the priority date of the present application, downloaded from the internet on Jul. 20, 2023.

Surface Systems and Instruments, Inc., "CS9300 Portable Inertial Profiler", https://www.smoothroad.com/equipment/inertial-profilers/cs9300-portable-inertial-profiler/, webpage of a product believed to be available prior to the priority date of the present application, downloaded from the internet on Jul. 20, 2023.

Surface Systems and Instruments, Inc., "CS9400 Simple Profiler", https://www.smoothroad.com/equipment/inertial-profilers/cs9400-simple-profiler/, webpage of a product believed to be available prior to the priority date of the present application, downloaded from the internet on Jul. 20, 2023.

* cited by examiner

SURFACE PROFILE MEASURING APPARATUS AND METHOD HAVING NO MINIMUM SPEED REQUIREMENT

CROSS-REFERENCE TO RELATED APPLICATIONS

The present application is a continuation of U.S. application Ser. No. 17/014,626 filed Sep. 8, 2020, which claims the benefit of priority to U.S. Provisional Patent Application Ser. No. 62/897,521, entitled "Method and Apparatus for Surface Profile Measurement Requiring No Forward Starting Speed of the Host Vehicle Platform", filed Sep. 9, 2019. The aforementioned applications are incorporated by reference herein for all purposes.

FIELD OF THE INVENTION

The present application is directed to surface profiler instruments that measure and generate surface profiles when attached to a vehicle, and more particularly, to surface profiler instruments that are capable of generating a surface profile with no minimum speed requirement.

DESCRIPTION OF RELATED ART

In the pavement construction industry, inertial profiling systems are commonly used for quality control and compliance purposes. The most common use of inertial profilers is to test the "smoothness" of a surface, such as the top layer of asphalt or concrete pavement, on a road, bridge or airfield. Transportation agencies also commonly use inertial profiling systems for pavement management and maintenance applications. Roads, bridges and airfields are periodically analyzed for condition assessment and for making decisions with regard to rehabilitating or resurfacing of the surface.

A typical inertial profiling system is mounted onto a vehicle and then driven over the surface to be measured. One or more encoder(s), GPS-based device(s), or Doppler device(s) is/are used to measure the longitudinal distance traveled by the vehicle. The inertial profiler system also includes one or more height sensors(s) for measuring vertical displacement from a fixed point on the vehicle to the surface underneath and one or more accelerometer(s) to measure the vertical acceleration of the vehicle. As the host vehicle travels over the surface, the output of the height sensor(s) and a double-integrated output from the accelerometer(s) are combined to generate a relative profile, with each height in the profile correlating to a longitudinal point as measured by the above-listed devices.

Commercially available inertial profilers generate only a two-dimensional relative surface profile along a longitudinal path on a surface traveled by the vehicle hosting the profiler system and the height measurements. The height profile of a surface generated by some inertial profiling systems is a relative profile, not a true elevation profile. Inertial profiling systems typically do not generate a true elevation profile since the height measurements are not absolute elevation readings. Thus, while an inertial profiling system can accurately detect the relative height changes in the surface profile from one profile point to the next, they cannot reliably detect a true elevation change from the start of the profile to the end of the profile.

More advanced surface profilers also rely on GPS or survey instrument data for receiving elevation data, which is then combined with the relative vertical sample point measurements. The net result is a surface profile that includes more accurate elevation readings in the Z dimension. See U.S. Pat. Nos. 8,352,189 and 8,352,188 for examples of GPS enhanced profilers, both of which are assigned to the assignee of the present application and incorporated by reference herein for all purposes.

One issue with current inertial profilers, regardless of the type, is that they all suffer from elevation drift over time. The elevation drift over time is caused by the double-integration of the accelerometer data, which converts the acceleration readings of the accelerometer into height readings. The double-integration process introduces an artificial trend into the measured level value output from the accelerometer data, which is commonly referred to as "drift". This drift problem is exacerbated during accelerations and decelerations due to the accelerometer sensor slightly rotating as momentum forces act on the vehicle, causing the front of the vehicle to either dip down or point up. As a result, the accelerometer data will often indicate an artificial "bump" in the road that does not actually exist.

Because of drift, current profilers are limited in their operation. As a general rule, only sections of the surface profile that were collected above a predetermined minimum speed are used in the analysis of the surface profile. Sections of the surface profile where the profiler system is traveling less than the threshold speed, decelerating, accelerating, or stopped, are typically ignored during analysis because the data is unreliable and/or inaccurate. As a result, current profilers require a startup or lead-in distance to reach a minimum speed threshold and maintain a minimum and reasonably constant speed before the data collected is considered valid, accurate, and repeatable. With commercial profilers currently available, the minimum speed threshold varies among manufacturers, but is at least 5 mph, but often higher, such as 10 or even 15 mph.

Such a minimum speed requirement creates a number of practical limitations when using profilers. For example, when measuring the surface of a paved highway, the portions of the paved surface traveled prior to reaching the minimum speed (i.e., the startup distance) are not included in the analysis of the surface profiles. In addition, since stopping results in areas of inaccurate profile data due to drift, the profiler typically needs to be operated in long runs without intermediate stops. In urban areas, space may not be readily available for the startup distance and traffic lights, stop signs, or traffic congestion force frequent vehicle stoppages. Due to these scenarios and safety concerns, road profiling often requires either (a) road closures or traffic control, which can be costly and time-consuming and/or (b) exclusion of the areas where the profiler failed the minimum speed threshold.

A surface profiler system and method that can collect valid, accurate and repeatable data at any speed, with accelerations and decelerations, and without any lead-in or lead-out distances, is therefore needed.

SUMMARY

The present application is directed to a surface profiler system arranged to be used on a host vehicle. The profiler system is capable of (a) receiving data collected by a group of sensors while traveling over a surface, (b) generating a profile of that surface using the data collected with no minimum speed requirement, and (c) collecting accurate profile data without lead-in or lead-out distances. Since there is no minimum speed requirement, the profiler is capable of generating valid, accurate, and repeatable surface profiles in situations not previously possible, such as during a stop, during acceleration of the host vehicle following a stop, during deceleration of the host vehicle, and while the host vehicle is traveling at very low speeds below thresholds typically required by prior art profilers.

In one non-exclusive embodiment, the "zero-speed" profiler system of the present invention is capable of generating surface profiles with no minimum speed requirement of the host vehicle by blending (a) inertial profile data and (b) running slope profile data. In particular, the blending of the data is performed by combining (c) short wavelength components of the inertial profile data and (d) long wavelength components of the running slope profile data.

The short wavelength inertial profile data is acquired by applying a high-pass filter to the inertial profile to remove the long wavelength components from the original inertial profile. The long wavelength running slope profile is acquired by applying a low-pass filter to remove the short wavelength components from the running slope profile. Finally, the short wavelength data from the inertial profile is combined with the long wavelength data from the running slope profile resulting in the final "zero-speed" profile of the measured surface.

In various alternative embodiments, low-pass and/or high-pass filtering may be performed in either the time domain or the spatial (distance) domain to achieve similar results. In both filtering methods, a band-pass filter may also be used to ignore non-essential profiler wavelengths. In yet another alternative embodiment, a Kalman Filter or other complementary filters may be used with the inertial profile and running slope profile to achieve similar results of utilizing the shorter wavelengths of the inertial profile and the longer wavelengths of the running slope profile.

The Applicant has developed yet additional embodiments to generate zero-speed road surface profiles using INS and/or GNSS data as opposed to pitch data. As a result, some of the hardware, such as secondary height sensors and/or vertical accelerometers, can be eliminated. With these embodiments, Inertial Navigation System (INS) data, including data from the Global Navigation Satellite System (GNSS) and/or an Inertial Measurement Unit (IMU), are processed to generate highly accurate vehicle elevation profiles and/or 3D road surface elevations and vehicle dynamics information. This information is then selectively combined with inertial and/or height sensor information to generate zero-speed road surface profiles.

In yet other embodiments, the profiler is capable of generating additional surface profiles for additional tracks of surface data. In variations of this embodiment, additional track surface profiles can be a true surface profile generated as described above. Alternatively, any additional track's running slope profile can be calculated by projecting the running slope profile of the first or main track to any additional track. The projected running slope profile data and inertial profile data for any additional track can then be used to calculate that additional track's profile.

In yet additional implementation embodiments, the profiler system can include a set of measuring instruments that are installed on a host vehicle as described herein. Alternatively, the set of instruments can also be installed on a "stand-alone" profiling device that is designed to be rolled over a road surface to be measured. Such stand-alone profiling devices can be either self-propelled or are propelled by other means, such as being hitched to another vehicle, pushed, pulled, etc. In yet other embodiments, the above-described data processing, including filtering, blending and/or the use of INS, GNSS and/or IMU data to generate surface 3D road surface elevations and vehicle dynamics can be performed by one or more computers located on site or at a remote location.

BRIEF DESCRIPTION OF THE DRAWINGS

The present application and the advantages thereof, may best be understood by reference to the following description taken in conjunction with the accompanying drawings in which.

In the drawings, like reference numerals are sometimes used to designate like structural elements. It should also be appreciated that the depictions in the Figures are diagrammatic and not necessarily to scale.

DETAILED DESCRIPTION

The present application will now be described in detail with reference to a few non-exclusive embodiments thereof as illustrated in the accompanying drawings. In the following description, numerous specific details are set forth in order to provide a thorough understanding of the present disclosure. It will be apparent, however, to one skilled in the art, that the present discloser may be practiced without some or all of these specific details. In other instances, well known process steps and/or structures have not been described in detail in order to not unnecessarily obscure the present disclosure.

Figure 1:
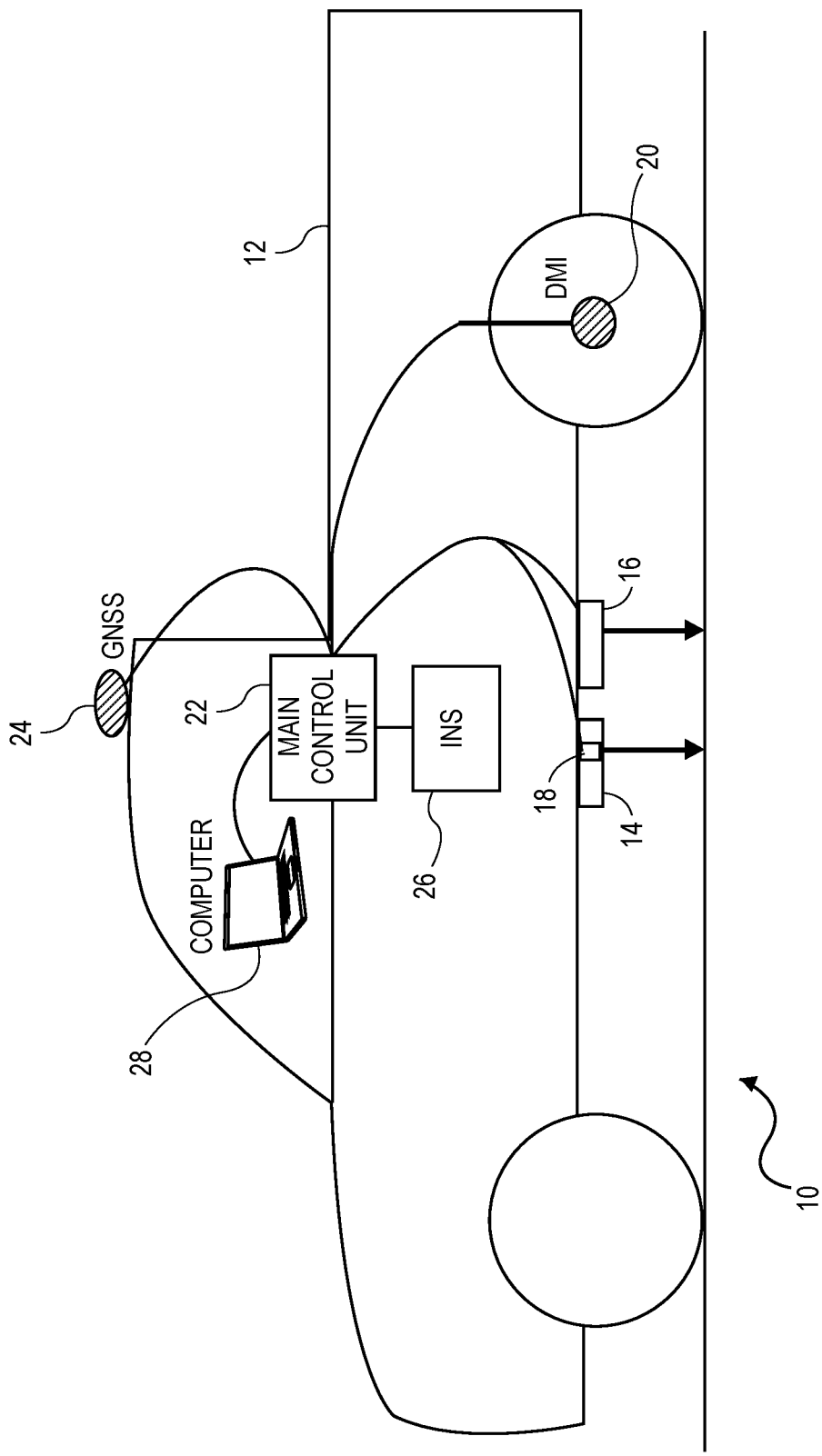
FIG. 1 illustrates a profiler capable of collecting valid data for generating surface profiles with no minimum speed requirement in accordance with a non-exclusive embodiment of the invention.

Referring to FIG. 1, a profiler system 10 mounted on a host vehicle 12 (e.g., a suspended vehicle such as pickup truck or passenger vehicle having a suspension system) is illustrated. The profiler system 10 includes a primary height sensor 14, a secondary height sensor 16, a vertical accelerometer 18, a Distance Measurement Instrument (DMI) 20, a main control unit 22, a Global Navigation Satellite System (GNSS) receiver 24, an Inertial Navigation System (INS) 26 and a computer 28, such as a laptop, tablet computer, smart phone or other computing device, typically (although not necessarily) located in the cabin of the host vehicle 12. In alternative embodiments, the computer 28 can be a desktop or server computer provided at another location, such as an office.

In various embodiments, the DMI 20 can be wheel-based (as illustrated) or located elsewhere, such as on another location on the host vehicle 12, such as a bumper, door or other body panel, axle, etc. In addition, the DMI 20 can either be an encoder, a GPS-based distance measurement device, a Doppler device, an Onboard Diagnostic Signal (e.g., an OBD-II signal), an INS based distance measuring device, a radar sensor, or a combination of some or all of these devices.

In various embodiments, the INS 26 includes an Inertial Measurement Unit (IMU) (not illustrated in FIG. 1) and the GNSS receiver 24. In yet other embodiments, the INS 26 may also include the DMI 20, or alternatively, the DMI 20 can be separate as illustrated. In other embodiments, an inclinometer, multi-axis accelerometer, gyroscope, or any other type of tilt sensor can be used in place of the INS 26.

As described in more detail below, the profiler system 10 is capable of blending inertial profile data and running slope data, enabling the generation of surface profiles with no minimum speed requirement. As a result, the profiler system 10 is capable of generating surface profiles previously not possible, including during stoppages, during accelerations, during decelerations, or at very slow speeds, such as below minimum thresholds typically required by prior art profilers and without lead-in or lead-out sections.

Single Track Versus Multiple Tracks

The embodiment shown in FIG. 1 is a "single-track" configuration, meaning the primary height sensor 14, the secondary height sensor 16, and the vertical accelerometer 18 are all longitudinally mounted on the vehicle 12, typically along a first track. With a double-track implementation, an additional set of height sensors and an accelerometer are longitudinally arranged on the vehicle, usually along the second track. For third or additional track implementations, then a similar set of height sensors and an accelerometer are used for each track respectively. Each track can be laterally positioned anywhere on the vehicle. Multiple tracks are typically laterally spaced apart by some known distance.

For the sake of simplicity, profile generation of just a single-track system is described below. In multiple-track implementations, multiple profiles, one for each track, are generated in parallel using the same or a similar method as described below.

Single Track Road Surface Profile Generation

Figure 2A:
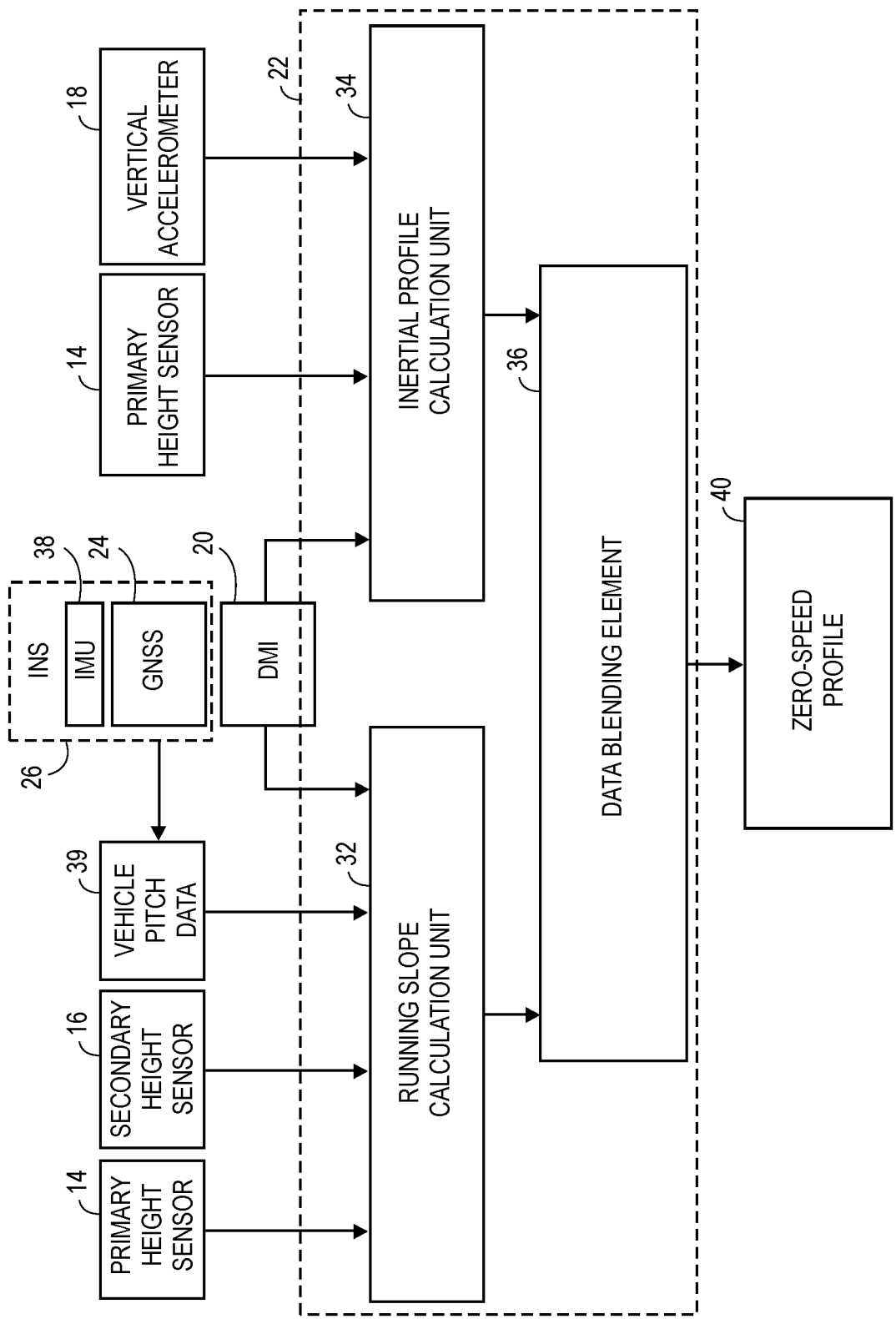
FIGS. 2A and 2B are logic diagrams for generating a single-track surface profile in accordance with a non-exclusive embodiment of the invention.

Referring to FIG. 2A, a block diagram of the main control unit 22 of the profiler system 10 is illustrated. The main controller unit 22 includes a running slope calculation unit 32, an inertial profile calculation unit 34 and a data blending element 36.

The running slope calculation unit 32 is arranged to receive inputs from the primary height sensor 14, the secondary height sensor 16, the DMI 20, and vehicle pitch data 39 generated by the INS 26. The primary and secondary height sensors 14 and 16 are each arranged to measure the relative height of the host vehicle to the ground surface respectively. The DMI 20 is arranged to measure the incremental longitudinal distance of the host vehicle 12 while traveling over a surface. The INS 26 combines data from the GNSS 24 and an IMU 38 to generate the vehicle pitch data 39. Inertial Navigation Systems (INS) are typically designed and used for measuring vehicle body motion and position where significant vehicle dynamics are present. The DMI 20 can also be used to help aid the INS 26. Alternatively, as noted above, an inclinometer, multiple-axis accelerometer, gyroscope, or any other type of tilt sensor could be used instead of the INS 26 to obtain vehicle pitch data 39.

The running slope calculation unit 32 generates a time-based collection of angles of the surface traveled by the host vehicle 12 by:
1. Calculating the height difference between the measured heights of the primary height sensor 14 and the secondary height sensor 16;
2. Determining an angle between the two height sensors 14, 16 by dividing the height difference by the physical distance between the two sensors 14, 16. For instance, if the two sensors 14, 16 are longitudinally arranged a distance "A" apart on the host vehicle 12, then the height difference is divided by "A" to calculate the angle between the two sensors. It should be understood that longitudinal distance "A" between the two sensors 14, 16 may be any longitudinal distance on the host vehicle 12. In non-exclusive embodiments, the distance is 12 inches or 8.375 inches. Regardless of the distance "A", the actual longitudinal distance is used to divide the height differential between the two sensors 14, 16 to derive the angle;
3. The calculated angle is then combined with vehicle pitch data 39 to obtain the running slope angle (or "running slope data") of the surface between the two height sensors 14, 16.

The inertial profile calculation unit 34 receives inputs from the first height sensor 14, the vertical accelerometer 18 and the DMI 20. The inertial profile calculation unit 34 double-integrates the vertical accelerometer sample data 18 on a time basis to get the time-based relative vehicle profile. The data from the primary height sensor 14 is then added to the time-based relative vehicle profile to obtain a time-based inertial profile of the road surface traveled by the host vehicle 12.

The data blending element 36 is responsible for combining (a) the running slope data as generated by the running slope calculation unit 32 and (b) the inertial profile as generated by the inertial profile calculation unit 34. The running slope profile is generally less capable of measurements at shorter wavelengths. The distance between the two height sensors 14, 16 limits the capability of the running slope profile to accurately measure any wavelength less than the distance (e.g., 12 inches or 8.375 inches for the embodiments mentioned above). The running slope profile is, therefore, more accurate on longer wavelengths without profile drift. On the other hand, the inertial surface elevation profile tends to be more accurate at the shorter wavelengths, but tends to drift over longer wavelengths. The data blending element 36 therefore:

(1) Filters out inaccurate short wavelength components from the running slope data by applying a filter to obtain long wavelength running slope data;
(2) Re-samples the running slope data to the distance domain;
(3) Integrates the running slope distance-based data to obtain a distance-based running slope profile;
(4) Filters the inertial profile to remove long wavelength;
(5) Re-samples the inertial profile data to the distance domain; and
(6) Adds the long wavelength running slope profile to the short wavelength inertial profile.

The net result of the data blending is the generation of an accurate "zero-speed" surface profile 40, regardless of the speed of the host vehicle. In other words, an accurate surface profile can be generated both (a) when there are vehicle stoppages, accelerations, and decelerations and (b) at very low speeds below a minimum speed, such as 5, 10 or 15 mph, as commonly required with prior art profilers.

Data Blending Algorithm

Figure 2B:
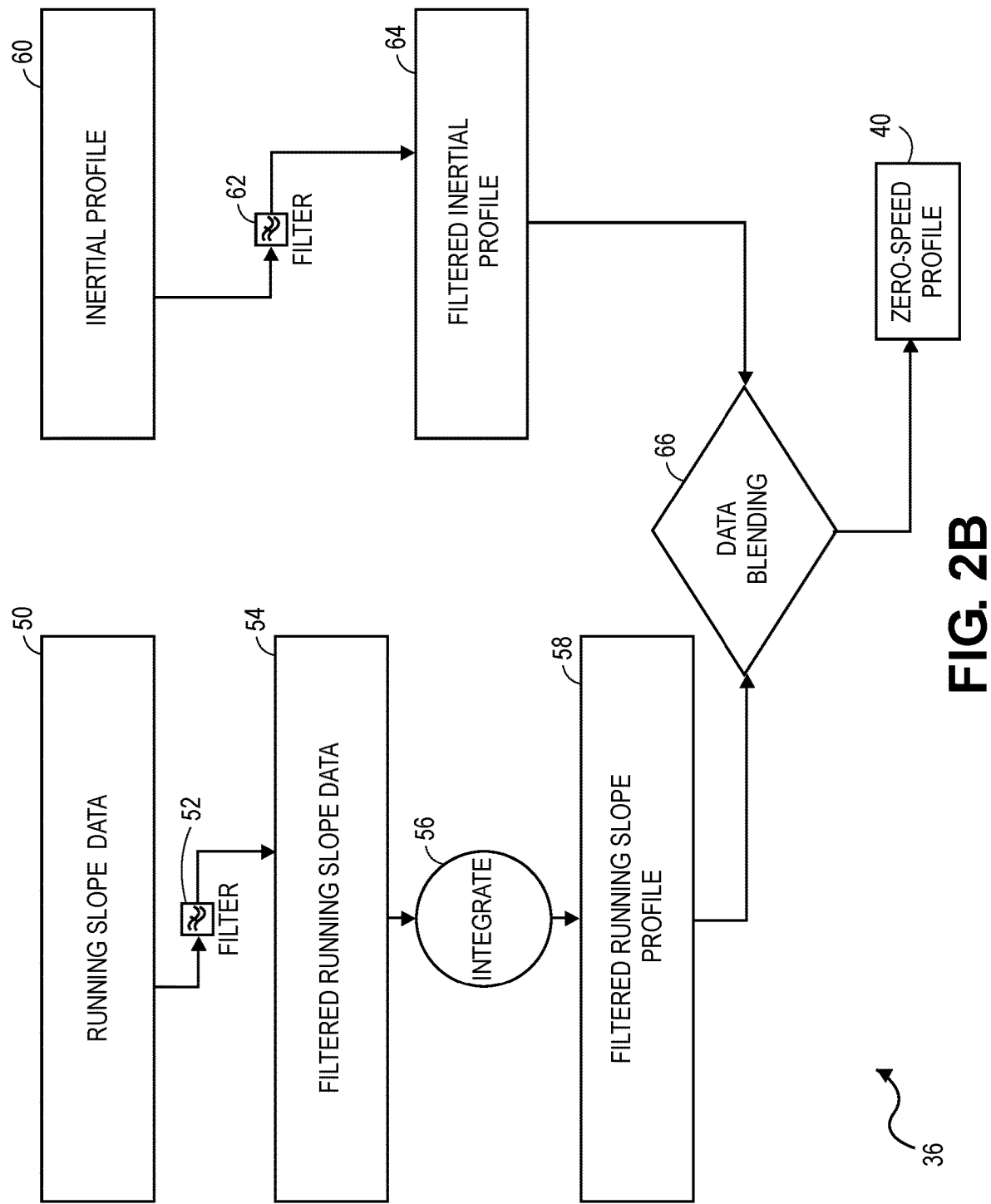

Referring to FIG. 2B, the data processing steps for the data blending performed by the data blending element 36 are illustrated.

The time-based running slope data 50, generated by the running slope calculation unit 32, is processed through a filter 52 for eliminating short wavelength components from the running slope data 50, resulting in filtered running slope data 54 with only long wavelength components. The filtered running slope data collection 54 is then sampled to the distance domain and integrated in step 56, resulting in a filtered running slope profile 58. As described in more detail below, the filtering may be performed in either the time or distance domains.

The inertial profile 60, generated by the inertial profile calculation unit 34, is processed with a filter 62 that removes the long wavelength components from the inertial profile 60. As a result, a filtered inertial profile 64 with only short wavelength components is generated. Again, the filtering can be performed in either the time or distance domains.

Finally, in the data blending 66, the filtered running slope profile 58 is added to the filtered inertial profile 64. As a result, the shorter wavelengths of the inertial profile 60 are blended with the longer wavelengths of the running slope data 50. Since the running slope 50 is more accurate on longer wavelengths while the inertial profile 60 tends to be more accurate at the shorter wavelengths, the combination or "blending" of the two results in a more accurate final surface profile with minimal to no drift.

During operation of the profiler system 10, data is collected to generate both the running slope profile 50 and the inertial profile 60. Once the data collection has been completed, the process above is executed by the main controller 22 and/or computer 28. As a result, a zero-speed road surface profile 40 is generated, regardless of the speed of the host vehicle 12, including for data collected during stops, during acceleration or deceleration of the host vehicle, or when the host vehicle 12 is traveling at a very low speed (e.g., 5 MPH or less), such as less than minimum speed requirements needed by prior art profilers, and also without any need for lead-in or lead-out distances.

The above described process is for a profiler system configured to measure a single track of surface data. In the case of multiple tracks, then the above process is essentially repeated in parallel for the multiple track(s) using data samples collected for each multiple track respectfully.

In a non-exclusive embodiment, the zero-speed profile 40 can be generated in essentially real time, meaning as the data is collected, it is processed "on the fly" by either the main control unit 22 and/or the computer 28. In alternative embodiments, the data processing can be performed elsewhere. For example, during profile runs, the data is collected as described herein and stored in either (or both) the main control unit 22 and/or the computer 28. The data processing for generating the zero-speed profile 40 can then later be performed by either the main control unit 22 or the computer 28. As previously noted, the computer 28 does not necessarily have to be located in the host vehicle 12, but rather can be located at a remote office. In such circumstances, the data is typically collected in the field and stored. The data is then later transferred to the computer 28, regardless of where located, and the data processing is performed, resulting in the zero-speed profile 40.

Filters

In one non-exclusive embodiment, the Applicant has elected to use a time domain low-pass filter cutoff of approximately 1.41 Hz for filter 52 and a complementary high-pass filter with a cutoff of the same frequency for filter 62. The particular cutoff of 1.41 Hz used herein is merely exemplary and should not be construed as limiting in any regard. In different time-domain embodiments, cut off times that are either higher or lower than 1.41 Hz may be used. The filtering may alternatively be done in the distance domain as well. For example, a cutoff of 30 feet may be used (assuming a vehicle speed of approximately 30 mph), which is roughly equivalent to the 1.41 Hz in the time domain. Again, when filtering in the distance domain, more or less than 30 feet may be used.

It is further noted that a number of factors may be considered when selecting a particular cut off frequency in either the time or distance domains. Such factors may include the data sampling characteristics, the frequency response, and the waveband accuracies of various sensors, etc.

In yet another alternative embodiment, a Kalman Filter or other complementary filters may be used with the inertial profile 60 and running slope profile 50 to achieve similar results of utilizing the shorter wavelengths of the inertial profile data and the longer wavelengths of the running slope profile data.

Projected Additional Track

Under certain circumstances, using two height sensors for any second or additional track may not be feasible, desirable, or economical. In which case, a "projected" second or additional track may be implemented by using only a primary height sensor and accelerometer for the second and/or additional track and vehicle roll data in place of any secondary height sensor normally required for a running slope profile. For a second projected track for example, a second primary height sensor and the vehicle roll data are used for determining a cross slope from the main track to the additional track location (e.g., from left to right or vice-versa) of the host vehicle 12. From the cross slope, a "projected" second running slope profile may be accurately estimated from the main track running slope profile. Once the projected running slope profile is defined, the additional projected zero-speed profile can be generated in a manner similar to that described above. If additional projected track(s) are desired, additional projected running slope profile(s) are generated in a similar manner using only a primary height sensor and accelerometer for each additional track and vehicle roll data in place of any secondary height sensor respectively.

Figure 3A:
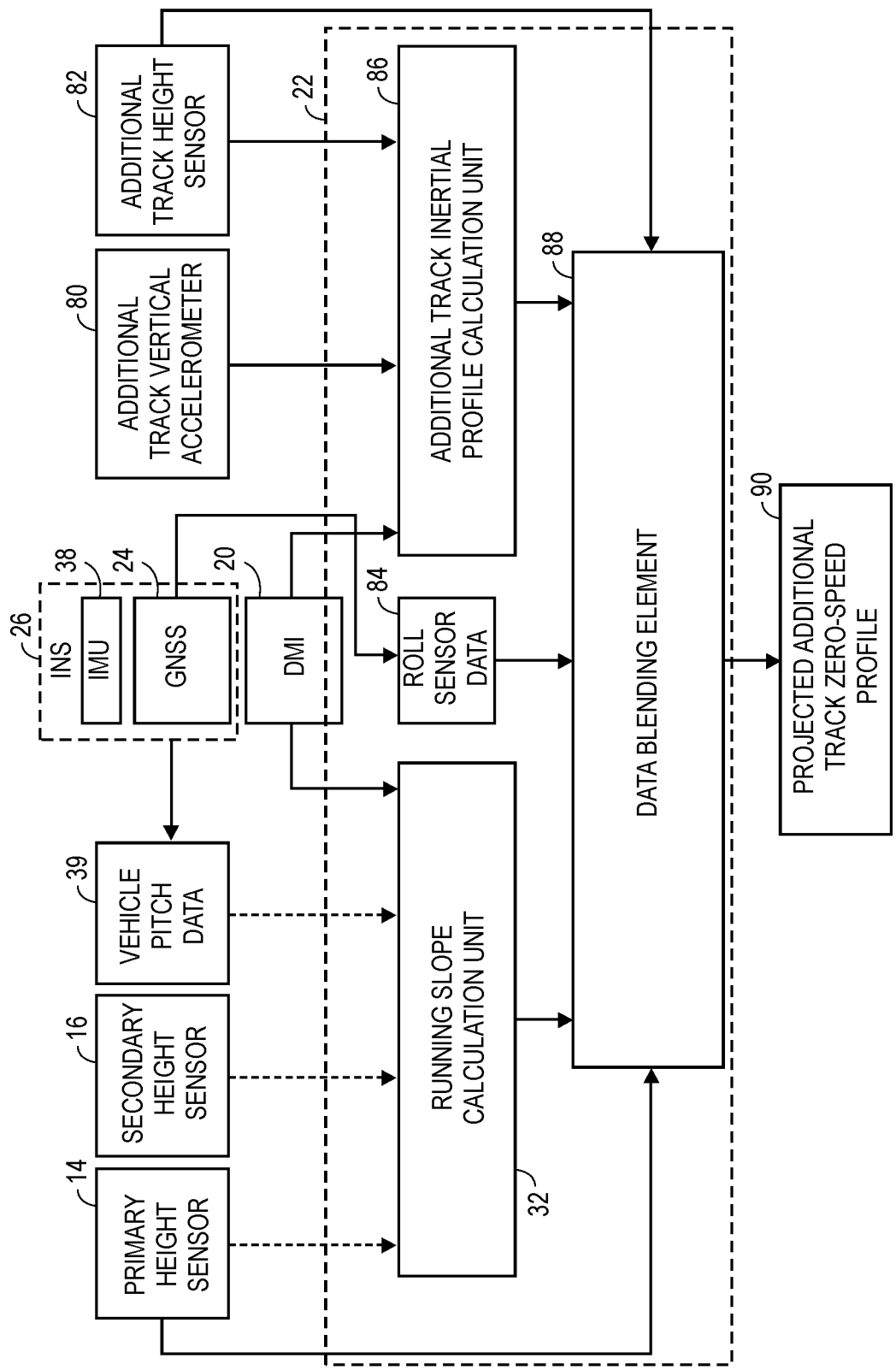
FIGS. 3A and 3B are logic diagrams for generating a projected additional track profile using vehicle cross-slope information in accordance with a non-exclusive embodiment of the invention.

Referring to FIG. 3A, a block diagram of a profiler system 10 that relies on a projected running slope for the projected additional track is illustrated. In this embodiment, the profiler includes, from the first or main track, the primary and secondary height sensors 14, 16, DMI 20, INS 26 that includes GNSS 24 and IMU 38, and the running slope calculation unit 32. Again, in an alternative embodiment, an inclinometer or any tilt sensor can be used in place of the INS 26 for generating the vehicle pitch and roll data.

The profiler system 10 further includes an additional track vertical accelerometer 80, an additional track height sensor 82, vehicle roll data 84 generated by the INS 26, an additional track inertial profile calculation unit 86, and a data blending element 88. The additional vertical accelerometer 80 and the additional track height sensor 82 are typically arranged longitudinally along the additional track of the host vehicle 12, opposite and parallel to the first or primary track.

The running slope calculation unit 32 generates a running slope profile of the surface traveled by the host vehicle 12 from the height sensors 14, 16, and the vehicle pitch data 39 as calculated by the INS 26 as previously described.

The additional track inertial profile calculation unit 86 generates an inertial profile for the additional track from the additional track vertical accelerometer 80 and the additional track height sensor 82, similar to the inertial profile calculation unit 34 as already described.

The data blending element 88, as described in more detail below with regard to FIG. 3B, blends the two profiles together, along with vehicle roll data 84, to generate a projected additional track zero-speed profile 90.

Figure 3B:
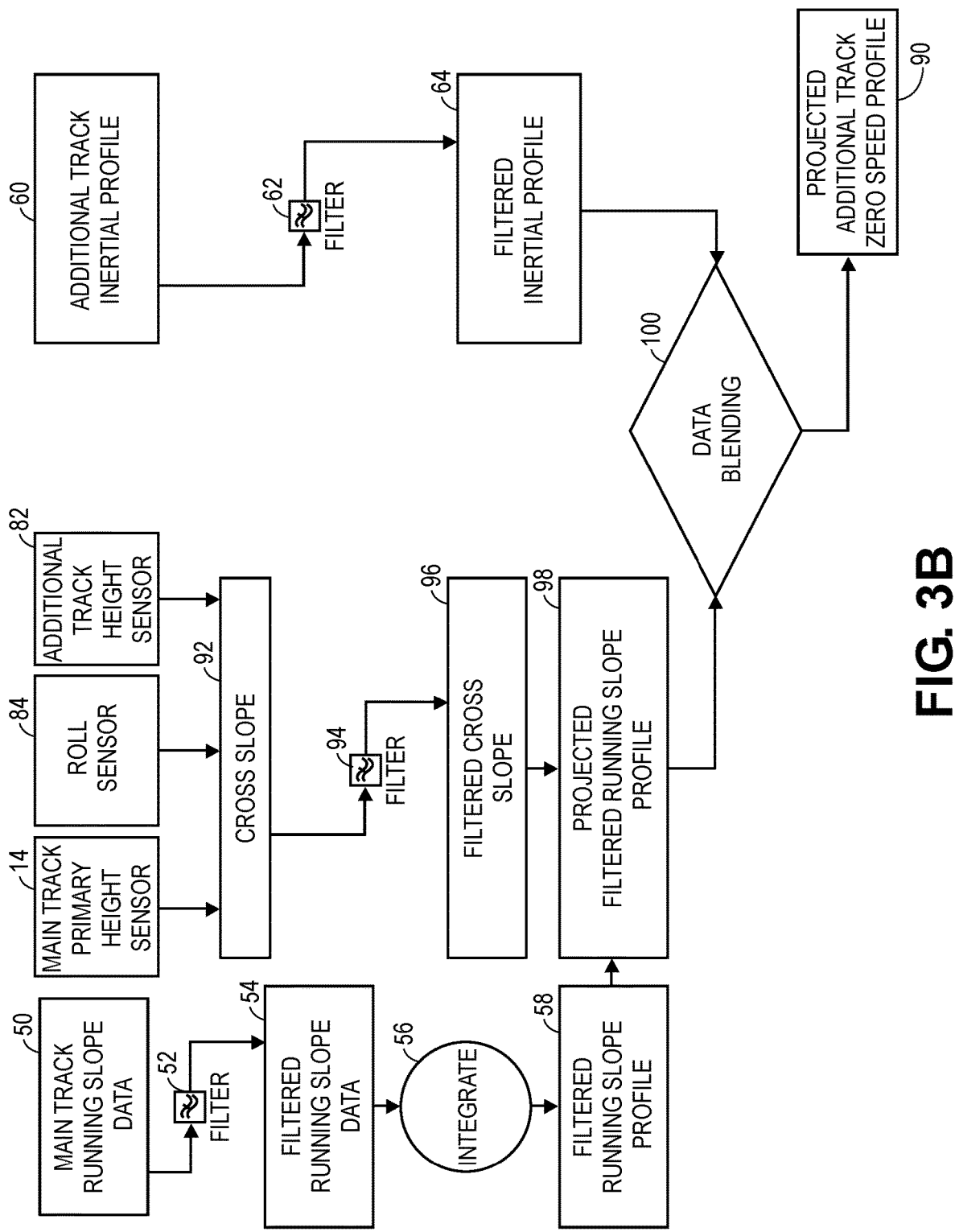

Referring to FIG. 3B, a logical block diagram of the data blending element 88 is illustrated.

For the main track, the data blending element 88 includes a filter 52 for eliminating short wavelength components from the main track running slope data 50, resulting in filtered running slope data 54 with only long wavelength components. The running slope data 54 is then re-sampled to the distance domain. An integrator 56 integrates the filtered running slope data 54 based on the distance sample interval, resulting in a filtered running slope profile 58 with only long wavelength components.

For the additional track inertial data, the data blending element 88 includes a filter 62 that removes the long wavelength components from the additional track inertial profile 60. As a result, a filtered inertial profile 64 with only short wavelength components is generated.

A cross slope 92 of the road surface is calculated from the main track primary height sensor 14, the additional track height sensor 82 and the vehicle roll data 84. With the two sensors 14, 82 located a known distance apart transversely on the vehicle, and the amount of roll of the host vehicle 12 as indicated by the vehicle roll data 84, the cross slope 92 of the roadway can be accurately measured. The cross slope 92 is then filtered by filter 94, removing the short wavelength components, resulting in a filtered cross slope 96 with only long wavelength components.

Each of the filters 52, 62 and 94 can operate in either the time domain or the distance domain. Also, the cut-off for each of the filters 52, 62 and 94 can be the same or different. In a non-exclusive embodiment, a cut off of 1.41 Hz is used for each of the filters 52, 62 and 94. Again, other cut offs, in either the time or distance domains, may be used, such as but not limited to 30 feet (at vehicle speeds of 30 mph). Furthermore, Kalman filters and/or other complementary filters may be used as well.

A projected filtered running slope profile 98 is generated by projecting the filtered running slope profile 58 onto to the alternate track using the filtered cross slope 96 and transverse distance between the first or main track and the alternate track. In other words, the projected filtered running slope profile is derived by modifying the main track filtered running slope profile by the degree of cross-slope on the surface between the main track and alternate track. In an alternative embodiment, un-filtered running slope data can be projected onto the additional track using un-filtered cross-slope data. The resulting projected running slope data can then be filtered to achieve a similar result. These are just two examples of many different ways a projected running slope profile can be generated.

The data blending element 100 generates the additional "projected" track zero-speed profile 90 by adding the projected filtered running slope profile 98 with the additional tracks filtered inertial profile 64. The result is an accurate projected additional track zero-speed profile 90 with little to no drift.

In one non-exclusive embodiment, the aforementioned process is repeated as data samples are collected. With each set of collected data samples, the projected track zero-speed profile 90 is updated as the host vehicle 12 travels over the road surface. In an alternative embodiment, the data can be collected during a profile run, including during accelerations, decelerations, stops and when the host vehicle is traveling at a very slow speed (i.e., below threshold speeds typically required for prior art profilers) and without lead-in or lead-out distances. The collected data is then saved. At a later time, the data is processed as described above, resulting in the generation of one or more zero-speed profile(s) 40 and/or second and/or additional projected additional track zero-speed profile(s) 90.

Figure 4:
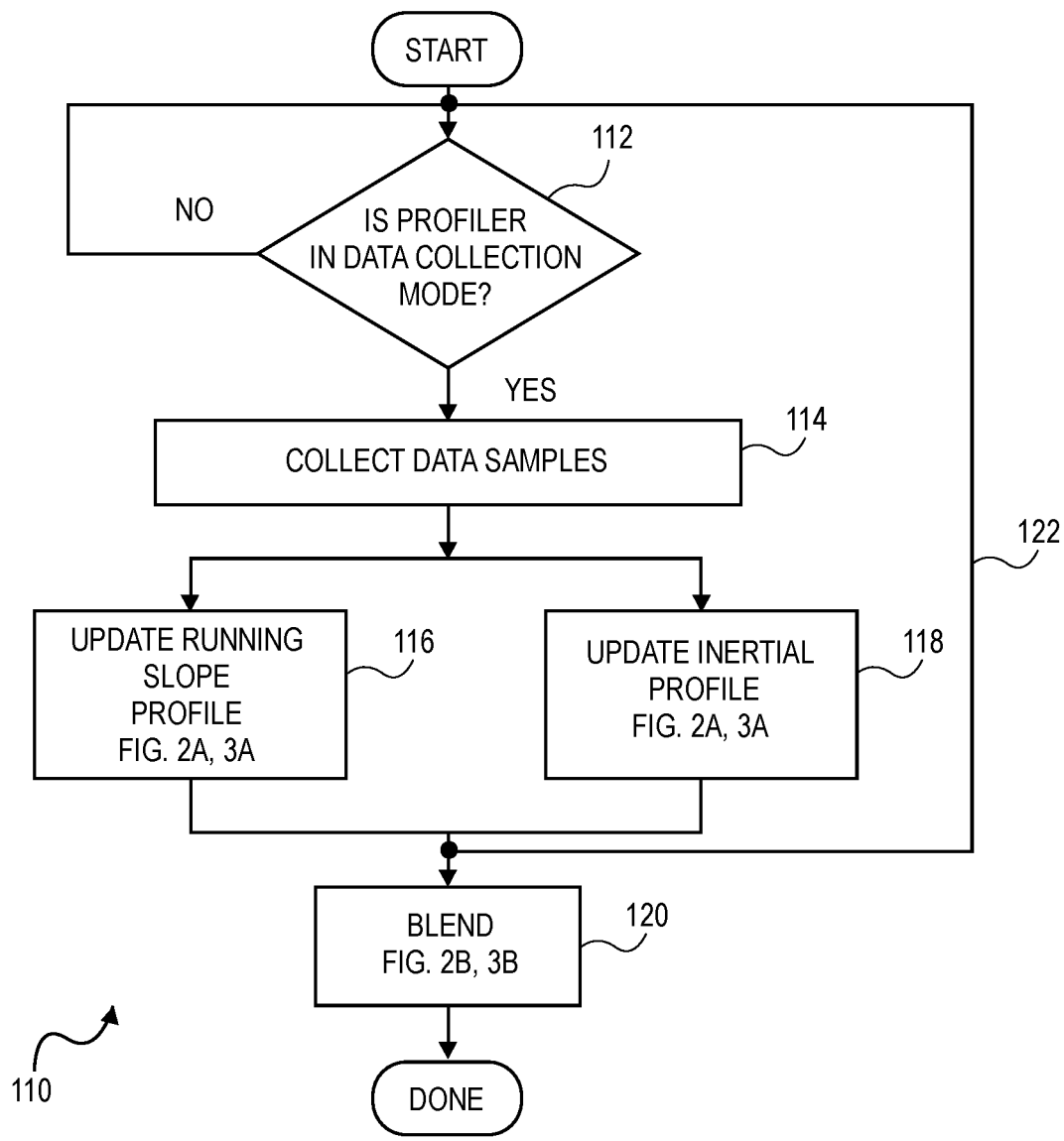
FIG. 4 illustrates a flow diagram for generating a surface profile with no minimum speed requirement in accordance with a non-exclusive embodiment of the invention.

Referring to FIG. 4, a flow diagram 110 is illustrated for generating a road surface profile without any speed requirement, including during stops, while the profiler system 10 accelerates or decelerates, or while moving at very slow speeds, including below thresholds commonly required for prior art profilers (e.g., 5, 10 or 15 mph), and without any lead-in or lead-out distances.

In the initial step 112, it is determined if the profiler is in data collection (i.e., operational) mode or not.

In step 114, data is collected from the various onboard sensors regardless of the host vehicle 12 being stationary or moving, and if the latter, regardless of the speed. With single-track implementations, or multiple single-track implementations, the sensors include the primary and secondary height sensors 14, 16, the vertical accelerometer 18, the vehicle pitch data 39 generated by the INS 26 or an inclinometer or tilt sensor. With a projected track implementation, data would also be collected from additional sensors including any additional track vertical accelerometer 80, any additional track height sensor 82 and the vehicle roll data 84.

In step 116, the running slope profile is updated with the newly collected data samples.

The inertial profile is updated as well in step 118. Both are updated as previously described with respect to either of FIG. 2A or 3A, depending on if the running slope is the main or projected track.

Control is then returned to decision step 112 and the above steps are repeated so long as the profiler system 10 is in the data collection mode.

In step 120, running slope profile and the inertial profile are blended together as described above with regard to FIG. 2B (single track) or 3B (projected track). As a result, the zero-speed profile 40/90 is generated. As a general rule, step 120 is performed in a post-processing step, meaning after all the data for a profiler run has been collected, processed and saved. In an alternative embodiment, however, the blending step 120 can also be done "on-the-fly", resulting in the generation of zero speed profiles in near real time.

Drift Vs. No Drift

Figure 5:
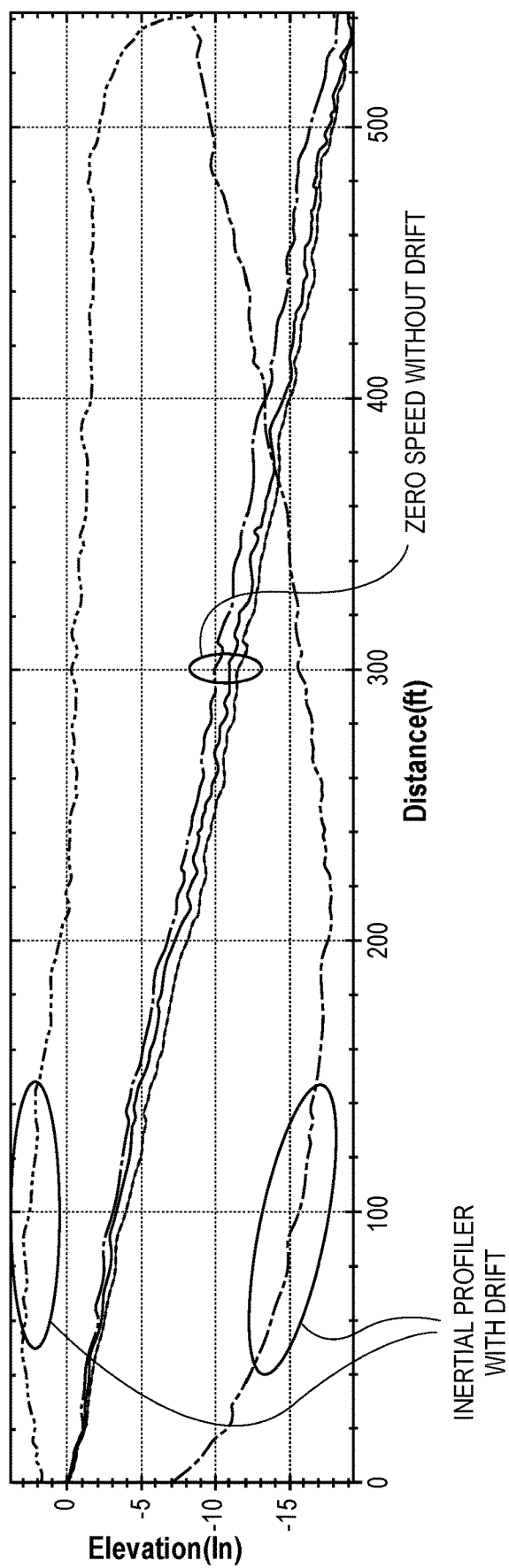
FIG. 5 is a plot comparing data drift with conventional inertial profilers and a profile from the zero-speed profiler without drift in accordance with the present invention.

Referring to FIG. 5, a plot comparing data drift with a conventional inertial profiler and a zero-speed profile without drift is illustrated. The plot includes distance in feet along the horizontal axis and elevation in inches along the vertical axis.

The upper and lower profiles show drift. When the distance and the relative elevation of the host vehicle 12 are measured, the vertical acceleration data samples are collected in units of seconds per inches square. By double-integrating, the data units are converted to just inches. The double-integration, however, causes the data to drift during accelerations and decelerations, which is graphically illustrated in the diagram.

The profiles in the middle of FIG. 5 are from the zero-speed system that is the subject of the present invention. The zero-speed profiles, on the other hand, show little to no drift. By combining the long wavelength running slope profile and short wavelength inertial profile, most or all of the drift resulting from the double-integration process is mitigated or removed. As a result, zero-speed profiles can be generated, including during a stop, during acceleration or deceleration of the host vehicle or at very slow speeds, such as below minimum thresholds typically required by prior art profilers, and without any lead-in or lead-out distances.

Data Processing Embodiments

In additional embodiments, the data processing as described above with regard to FIGS. 2A and 2B and/or FIGS. 3A and 3B for generating the zero-speed profiles 40/90 can be performed by the main control unit 22, the computer 28, or some combination thereof. In some embodiments, the main control unit 22 can be implemented in hardware, software, or a combination thereof. In yet other embodiments, the main control unit 22 is a dedicated data processing unit or a general data processing unit, such as a computer. In latter embodiments, the general data processing unit can be same computer 28 or another computer and can be located on or near the host vehicle 12 or at a remote location, such as a home office.

Embodiments Using 3D Surface Elevations to Generate Surface Elevation Profiles

The Applicant has developed yet additional embodiments to create long wavelength profiles that can be combined with the inertial profile data. With these embodiments, INS data, including data from the GNSS 24 and/or IMU 38, and 3D surface elevations collected by a lidar or similar sensor 202, are processed to generate more accurate road surface elevations and vehicle dynamics information. This information is then selectively combined with inertial and/or height sensor information to generate zero-speed profiles of the road surface.

In the various embodiments described in more detail below, the data processing of the INS, GNSS data and/or 3D surface elevations is performed in the time domain. In the particular embodiments described below, the low-pass filter cutoff that is used is approximately 1.41 Hz. Again, this cut off time is merely exemplary and cut off times that are less than or more than 1.41 Hz may be used. It should be understood that the processing as described herein can also be implemented in the distance domain as well. Correspondingly, a wide range of distances may be used when processing in the distance domain.

Figure 6:
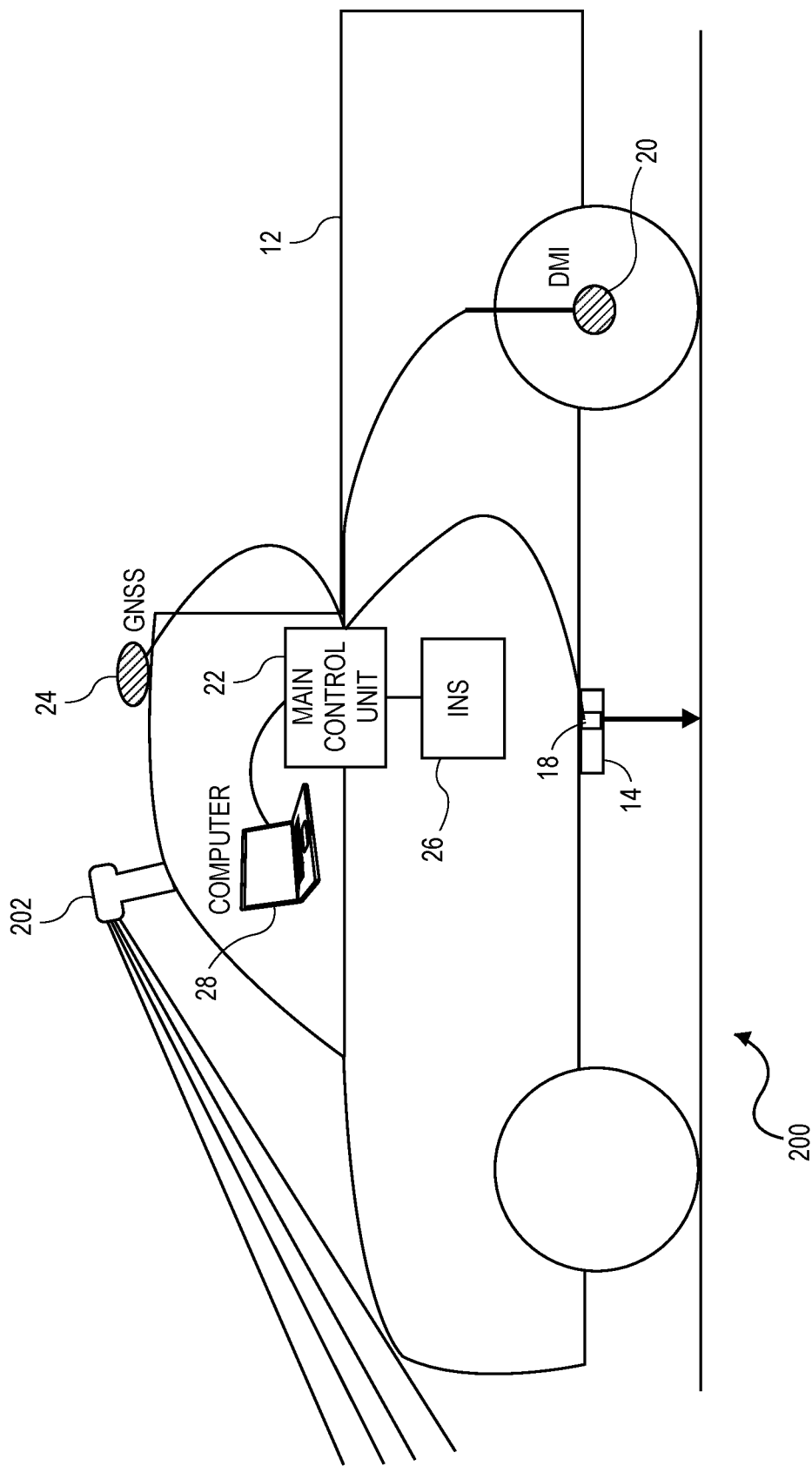
FIG. 6 illustrates an additional embodiment that utilizes 3D surface elevations instead of pitch from a secondary height sensor when generating surface profiles with no minimum speed requirement in accordance with the present invention.

Referring to FIG. 6, a profiler system 200 mounted on a host vehicle 12 is illustrated. The profiler system 200 of this embodiment includes a primary height sensor 14, a vertical accelerometer 18, a Distance Measurement Instrument (DMI) 20, a lidar sensor 202, a main control unit 22, a Global Navigation Satellite System (GNSS) receiver 24, an Inertial Navigation System (INS) 26 and a computer 28, such as a laptop, tablet computer, smart phone or other computing device, typically (although not necessarily) located in the cabin of the host vehicle 12 or at another location, such as an office. As each of the above elements was previously described, a detailed explanation is not provided herein for the sake of brevity.

The profiler system 200 of FIG. 6 differs from the same of FIG. 1 in two regards. First, the secondary height sensor 16 is removed. The profiler system 200, therefore, does not rely on pitch information generated by the secondary height sensor 16 as previously described. Second, a lidar or similar sensor 202 is provided on the host vehicle 12.

The lidar sensor 202 is arranged to generate 3D surface elevations of the road surface traveled just ahead of the vehicle as the vehicle 10 is traveling along a road surface. In an alternative embodiment, the lidar sensor 202 can be pointing behind the vehicle and is responsible for generating 3D surface elevations of the road surface behind the vehicle as the vehicle drives over the road surface. As is well known, the lidar sensor 202 scans the road surface, either in a rotating circle or in repeating scans in a direction orthogonal to the direction of travel of the vehicle. In response, the lidar unit 202 generates the 3D surface elevations of the road surface travelled by the vehicle 10 as is known in the art. Alternatively, other sensors [e.g. 3D laser profile sensor, a pairing of camera(s) and laser instrument(s) for surface imaging or measurement, stereo cameras, a LCMS (Laser Crack Measurement System, Pavemetrics Systems, Inc. Québec (Québec) Canada), etc.] capable of scanning a roadway from the vehicle to obtain 3D surface elevations can be used in place of the lidar sensor 202

Figure 7:
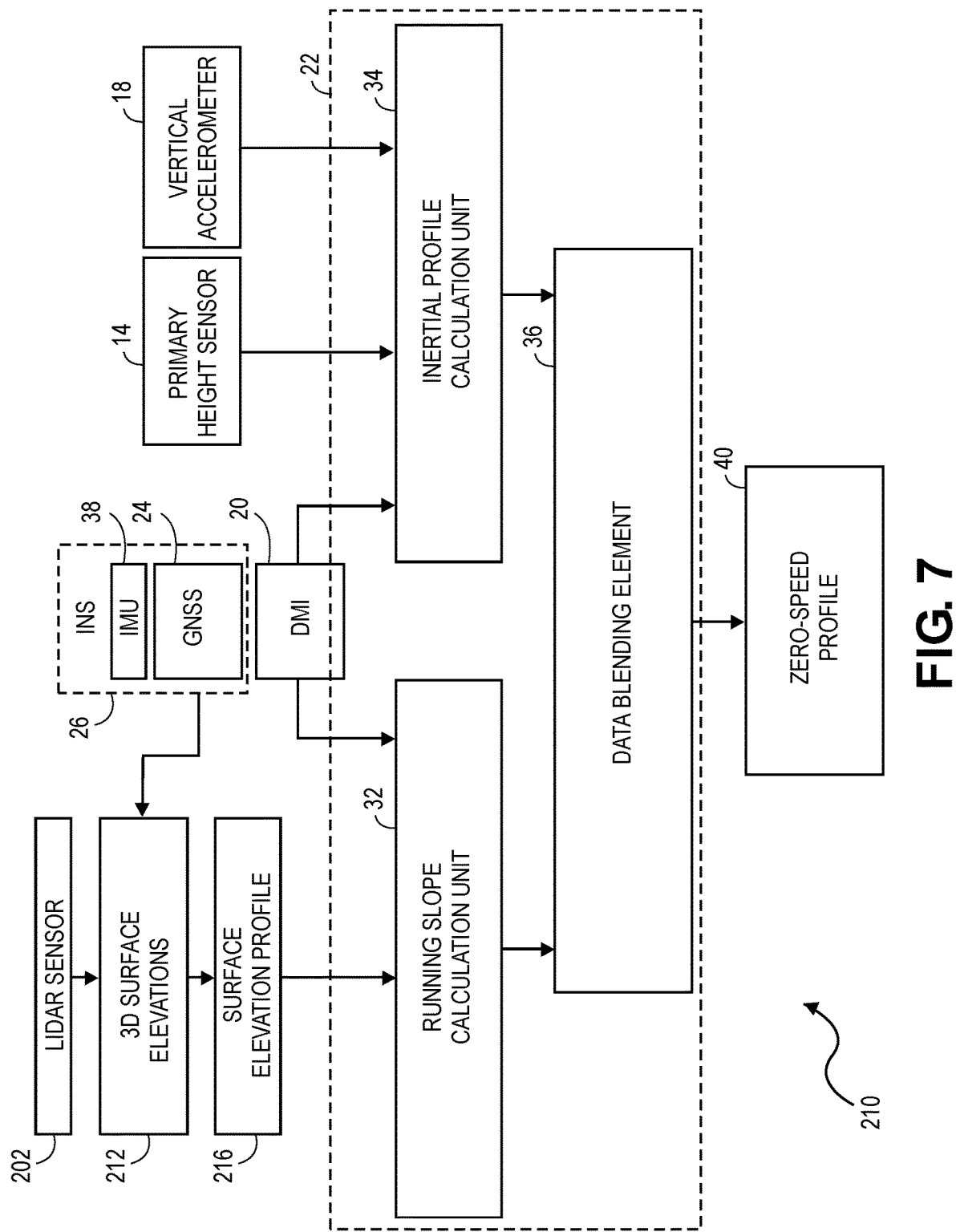
FIG. 7 is a logic diagram for generating a zero-speed profile from combining 3D surface elevations with the inertial profiler in accordance with the present invention.

Referring to FIG. 7, a flow diagram 210 implemented by the main control unit 22 and/or the computer 28, either alone or in cooperation with other computers, for generating a zero-speed profile by the profiler system 200 is illustrated. In this diagram, the steps involving the primary height sensor 14, vertical accelerometer 18, DMI 20, GNSS 24, INS 26, running slope calculation unit 32, inertial profile calculation unit 34, data blending element 36 are essentially all the same as previously described. As such, a detailed explanation of these elements is not provided again for the sake of brevity.

The 3D surface elevations 212 is generated by combining data from the lidar sensor 202 and data from the INS 26, including data from the GNSS 24 and/or the IMU 38. The IMU 38 data is indicative of all the dynamics of the vehicle, including motion, acceleration, and rotational rate, in each of the X, Y and Z directions. When combined with data from the GNSS 24, the net result is a vehicle elevation profile that is more accurate, particularly at longer wavelengths, for several reasons. First, the data from the INS 26 utilized data from the GNSS 24 that helps to maintain good long trend elevations once combined with the IMU 38. Second, the data from the INS 26 can be used to compensate for abrupt vehicle dynamics, such as sharp accelerations or decelerations, hard stops, sharp turns, etc., all of which can cause significant anomalies in the measurements sensed by the vertical accelerometer 18 used to generate the inertial profile. The DMI 20 can also be used to help aid the INS 26 by incorporating that data into the Kalman Filtering method used by the INS sensor or post-processing.

The 3D surface elevations 212 are utilized in place of the pitch profile as described above with respect to FIG. 2A. In other words, a surface elevation profile 216 is extracted from the 3D surface elevations 212 by extrapolating along a line or a track of the vehicle, such as along where ever the primary height sensor 14 and vertical accelerometer 18 are located transversely on the vehicle.

The running slope calculation unit 32 is arranged to receive the surface elevation profile 216 and input from the DMI 20. The running slope calculation unit 32 in response generates running slope data of the surface traveled by the host vehicle 12 by:

1. Extracting a longitudinal surface elevation profile 216 at a selected transverse location on the vehicle from the 3D surface elevations 212 in order to obtain the surface elevation profile 216 at any primary height sensor 14 location that is desired. The DMI 20 is arranged to measure the incremental longitudinal distance of the host vehicle 12 while traveling over the road surface.
2. The extracted surface elevation profile 216 is then differentiated using a predetermined base length to obtain a distance-based running slope profile. The differentiation converts the longitudinal surface elevation profile 216 into a running slope profile. In one embodiment, the base length is one foot or 12 inches. Again, this base length is just an example and smaller or larger base lengths may be used.
3. The running slope profile is then re-sampled from distance-based to time-based to create the running slope data 50 which is then used for Data Blending as shown in FIG. 2B.

The inertial profile calculation unit 34 receives inputs from the first height sensor 14, the vertical accelerometer 18 and the DMI 20. The inertial profile calculation unit 34 double-integrates the vertical accelerometer sample data 18 on a time basis to get the time-based relative vehicle elevation profile. The data from the primary height sensor 14 is then added to the time-based relative vehicle elevation profile to obtain a time-based inertial elevation profile of the road surface traveled by the host vehicle 12.

The data blending element 36 is responsible for combining (a) the running slope data as generated by the running slope calculation unit 32 and (b) the inertial profile as generated by the inertial profile calculation unit 34. The running slope profile is generally less capable of measurements at shorter wavelengths and is, therefore, more accurate on longer wavelengths without profile drift. On the other hand, the inertial surface elevation profile tends to be more accurate at the shorter wavelengths, but tends to drift over longer wavelengths. The data blending element 36 therefore:

(1) Filters out inaccurate short wavelength components from the running slope data by applying a filter to obtain long wavelength running slope data;

(2) Re-samples the running slope data to the distance domain;

(3) Integrates the running slope distance-based data to obtain a distance-based running slope profile;

(4) Filters the inertial profile to remove long wavelength;

(5) Re-samples the inertial profile data to the distance domain; and (6) Adds the long wavelength running slope profile to the short wavelength inertial profile.

The net result of the data blending is the generation of an accurate "zero-speed" profile 40 of the road surface, regardless of the speed of the host vehicle. In other words, an accurate surface profile can be generated both (a) when there are vehicle stoppages, accelerations, and decelerations and (b) at very low speeds below a minimum speed, such as 5, 10 or 15 mph, as commonly required with prior art profilers, and without any lead-in or lead-out distances.

Additional Tracks

The above describe process can be used for one or more additional projected tracks. With the 3D surface elevations 212, one or more additional tracks can be calculated using the same methodology as described above. The only difference being that with each track, the corresponding longitudinal line along the roadway is extracted from the 3D surface elevations 212 at different traverse locations with respect to the vehicle, each correlating to a primary height sensor used for each additional track respectively.

INS Data Embodiment without Data Blending

Figure 8A:
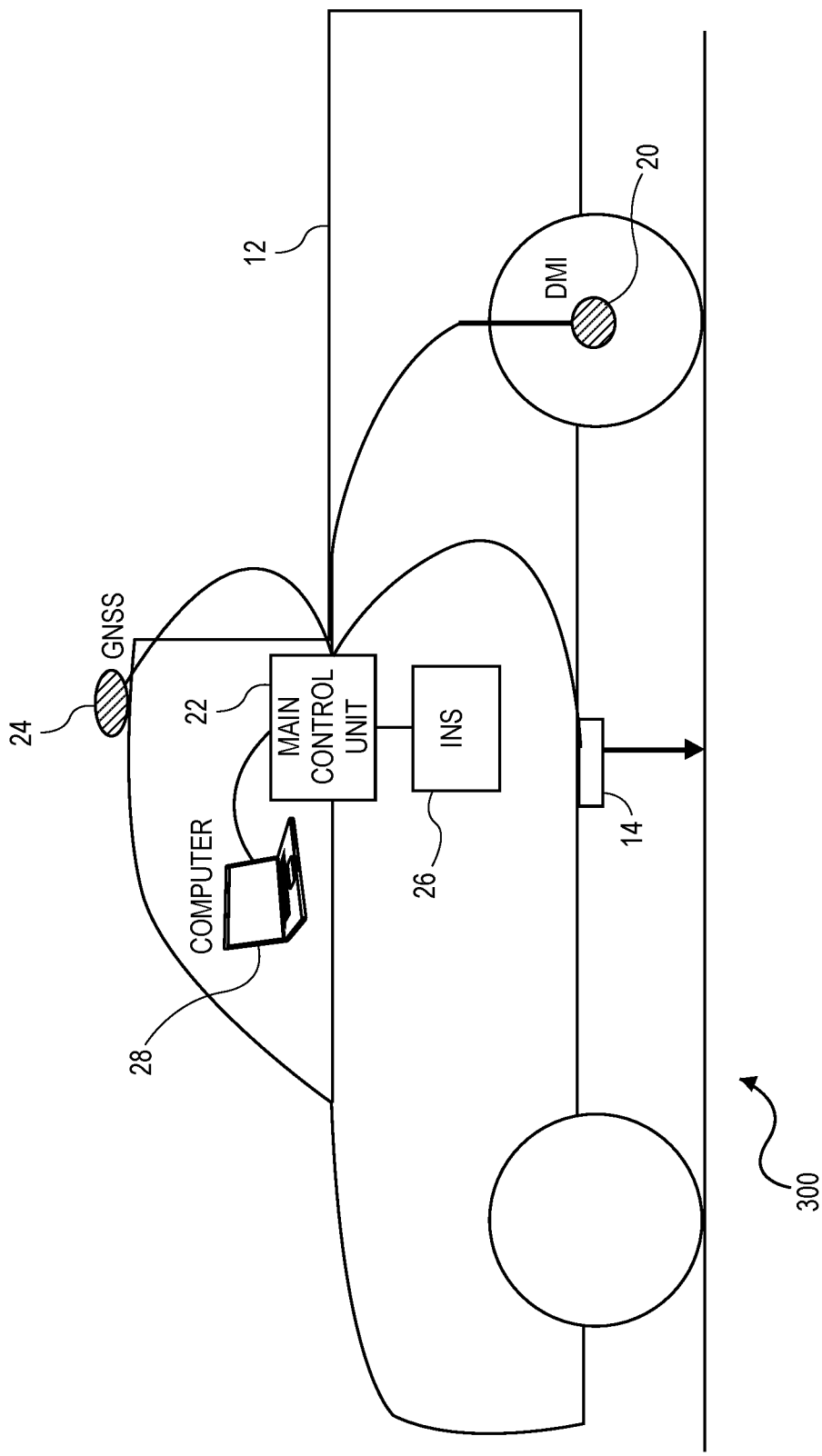
FIG. 8A illustrates an additional embodiment that utilizes INS vehicle data with a primary height sensor to generate surface profiles with no minimum speed requirement and no need for a secondary height sensor or separate vertical accelerometer in accordance with the present invention.

Referring to FIG. 8A, another profiler system 300 including components mounted on a host vehicle 12 is illustrated. The profiler system 300 of this embodiment includes a primary height sensor 14, a Distance Measurement Instrument (DMI) 20, a main control unit 22, a Global Navigation Satellite System (GNSS) receiver 24, an Inertial Navigation System (INS) 26 and a computer 28, such as a laptop, tablet computer, smart phone or other computing device, typically (although not necessarily) located in the cabin of the host vehicle 12 or at another location, such as an office. As each of the above elements was previously described, a detailed explanation is not provided herein for the sake of brevity.

The profiler 300 differs from the same of FIG. 1 in that the secondary height sensor 16 and the vertical accelerometer 18 are removed. The profiler 300, therefore, does not rely on pitch information generated by the secondary height sensor 16 nor the vehicle profile generated by the vertical accelerometer 18. Instead, the profiler 300 relies on height readings from the primary height sensor 14, along with vehicle elevation profile 314 generated by the INS 26.

Figure 8B:
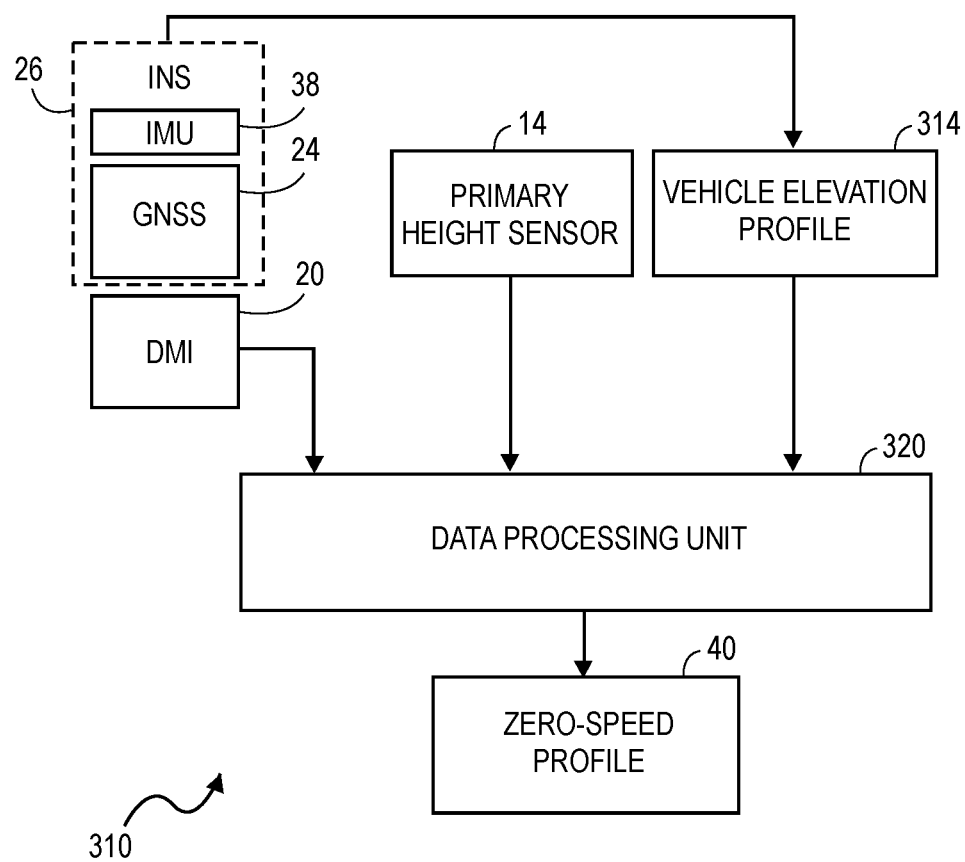
FIG. 8B is a logic diagram for generating a zero-speed profile from combining INS data with a primary height sensor without utilizing a data blending method in accordance with the present invention.

Referring to FIG. 8B, a flow diagram 310 for generating a zero-speed profile is illustrated. These data processing steps can be implemented by the main control unit 22 and/or the computer 28 alone or in cooperation with other computers.

In this embodiment, a vehicle elevation profile 314 is generated from processing of the data generated by the INS 26, including data from one or more of the DMI 20, GNSS 24, and/or IMU 38. In a non-exclusive embodiment, Kalman filtering is used to combine the data from the GNSS 24 and the IMU 38 and optionally data from the DMI 20, resulting in the vehicle elevation profile 314. In various embodiments, the INS 26 includes vehicle position information such as vehicle relative position, absolute position, acceleration, and velocity in each of the X, Y and Z directions (i.e., 9 degrees of freedom) as well other possible vehicle movements such as pitch, roll, and yaw respectively. Other forms of data from the INS 26 such as the vertical vehicle velocity or vertical vehicle acceleration can be used instead of absolute vehicle elevation by integrating or double-integrating respectively to get the vehicle elevation profile. This data from the INS 26 with or without DMI 20 can be processed with a Kalman Filter (or other commonly used similar filtering methods for combining GNSS and IMU data) in real-time with or without real-time Differential Global Positioning System or Differential Global Navigation Satellite Systems DGPS or DGNSS corrections from a base station, network of base stations, Satellite Based Augmentation System (SBAS) and/or Wide Area Augmentation System (WAAS) corrections, or any other method of receiving GNSS corrections. DGPS/DGNSS are methods of correcting GNSS receiver data to be more accurate to real-world positions than without using corrections. Basically, when DGPS/DGNSS are used, the mobile GNSS receiver receives the corrections data via cell modem, radio, internet, or satellite signal.

Alternatively, the data from the INS 26 with or without DMI 20 can be post-processed using similar methods as used in real-time but with higher degrees of accuracy due to processing and filtering the data in both forwards and reverse directions and having the capabilities of utilizing more than one corrections service. Like with real-time processing, the post-processing can be done with or without DGPS/DGNSS corrections from a base station, network of base stations, SBAS/WAAS corrections, or any other method of receiving GNSS corrections. Using data from the INS 26, a vehicle elevation profile 314 is extracted on a time basis.

A commercially available software package that is capable of providing an all in one solution for performing the above-described post-processing of the INS and/or DMI data includes Waypoint Inertial Explorer, Novatel, Inc. Calgary, Alberta, Canada.

The data samples from the primary height sensor 14 and the vehicle elevation profile 314 can then be re-sampled on a distance basis at the same sampling interval. In a data processing unit 320, the data samples from the primary height sensor 14 and the vehicle elevation profile 314 are added together on a distance basis to derive a longitudinal, zero-speed profile 40 of the road surface.

The advantage of the no blending embodiment is that it is simple to implement. The drawback, however, is that with currently available INS sensors, the sample frequency of the processed INS data may not be able to properly capture a suspension frequency of the host vehicle's suspension system. To the extent such commercially available software package provided more sampling frequency options, or is customized to provide more sampling frequency options, the wider the applicability of this embodiment becomes.

Additional Tracks

The above described no blending process can be used for one or more additional projected tracks. Alternatively, one could use the same INS 26 sensor data of the primary zero-speed profile for any additional track by translating the vehicle elevation profile, using the X, Y, and Z offset of the INS and INS attitude, to any additional track's height sensor 14.

INS Data Embodiment with Data Blending

With this embodiment, INS data is blended with inertial profile data so that bandwidth limitations associated with the INS data are largely circumvented. As a result, higher frequency components of the inertial profile data can be blended with the INS data.

Figure 9:
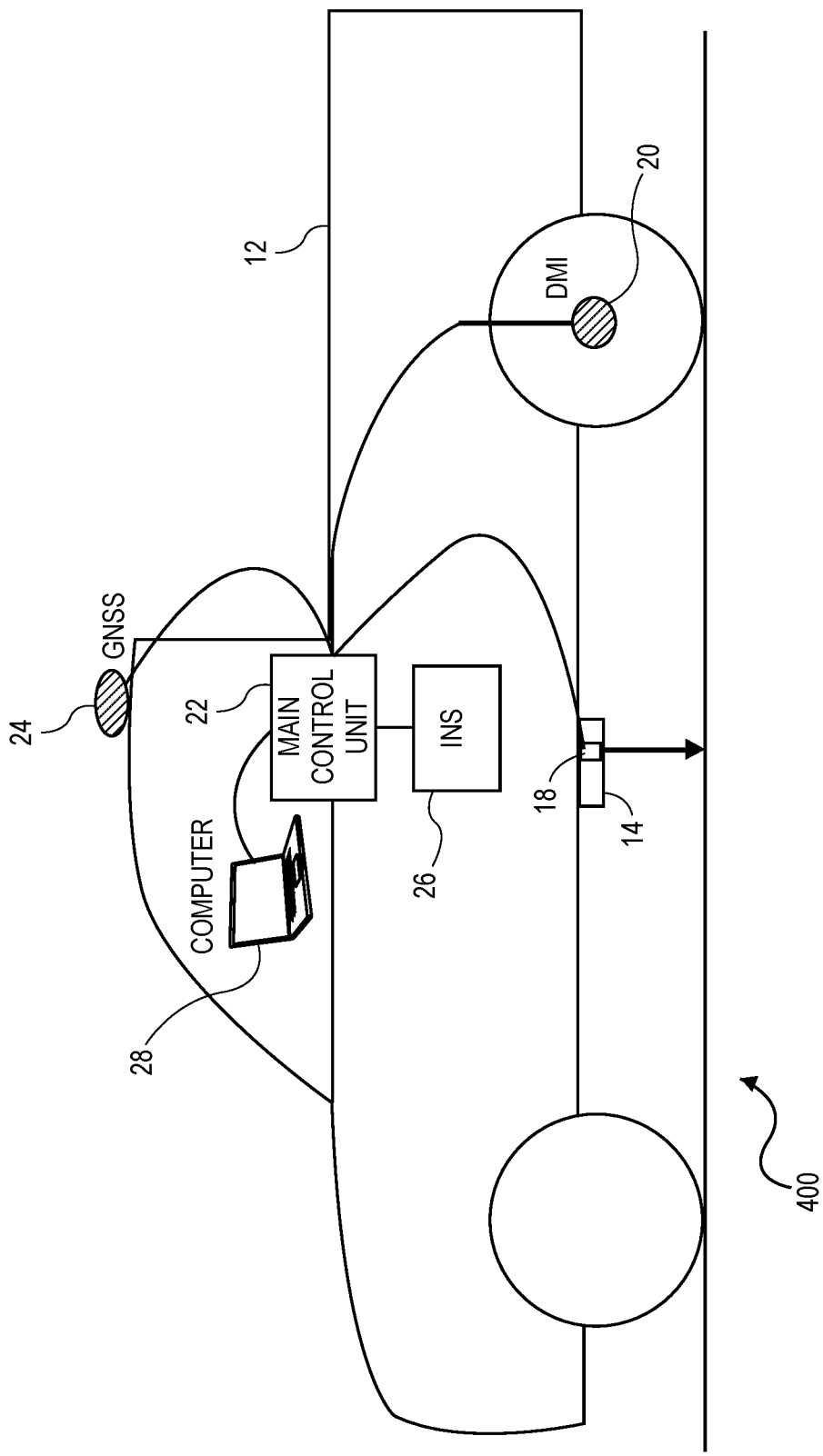
FIG. 9 illustrates an additional embodiment that utilizes INS vehicle data with an inertial profiler to generate surface profiles with no minimum speed requirement and no need for a secondary height sensor in accordance with the present invention.

Referring to FIG. 9, another profiler system 400 including components mounted on a host vehicle 12 is illustrated. The profiler system 400 of this embodiment includes a primary height sensor 14, a vertical accelerometer 18, a Distance Measurement Instrument (DMI) 20, a main control unit 22, a Global Navigation Satellite System (GNSS) receiver 24, an Inertial Navigation System (INS) 26 and a computer 28, such as a laptop, tablet computer, smart phone or other computing device, typically (although not necessarily) located in the cabin of the host vehicle 12 or at another location, such as an office. As each of the above elements was previously described, a detailed explanation is not provided herein for the sake of brevity.

The profiler system 400 differs from the same of FIG. 1 in that the secondary height sensor 16 is removed. The profiler system 400, therefore, does not rely on pitch information. Instead, the profiler 400 relies on height readings from the primary height sensor 14, along with vehicle elevation profile 314 derived from processing of the data generated by the INS 26 in a manner similar to that described above.

Figure 10:
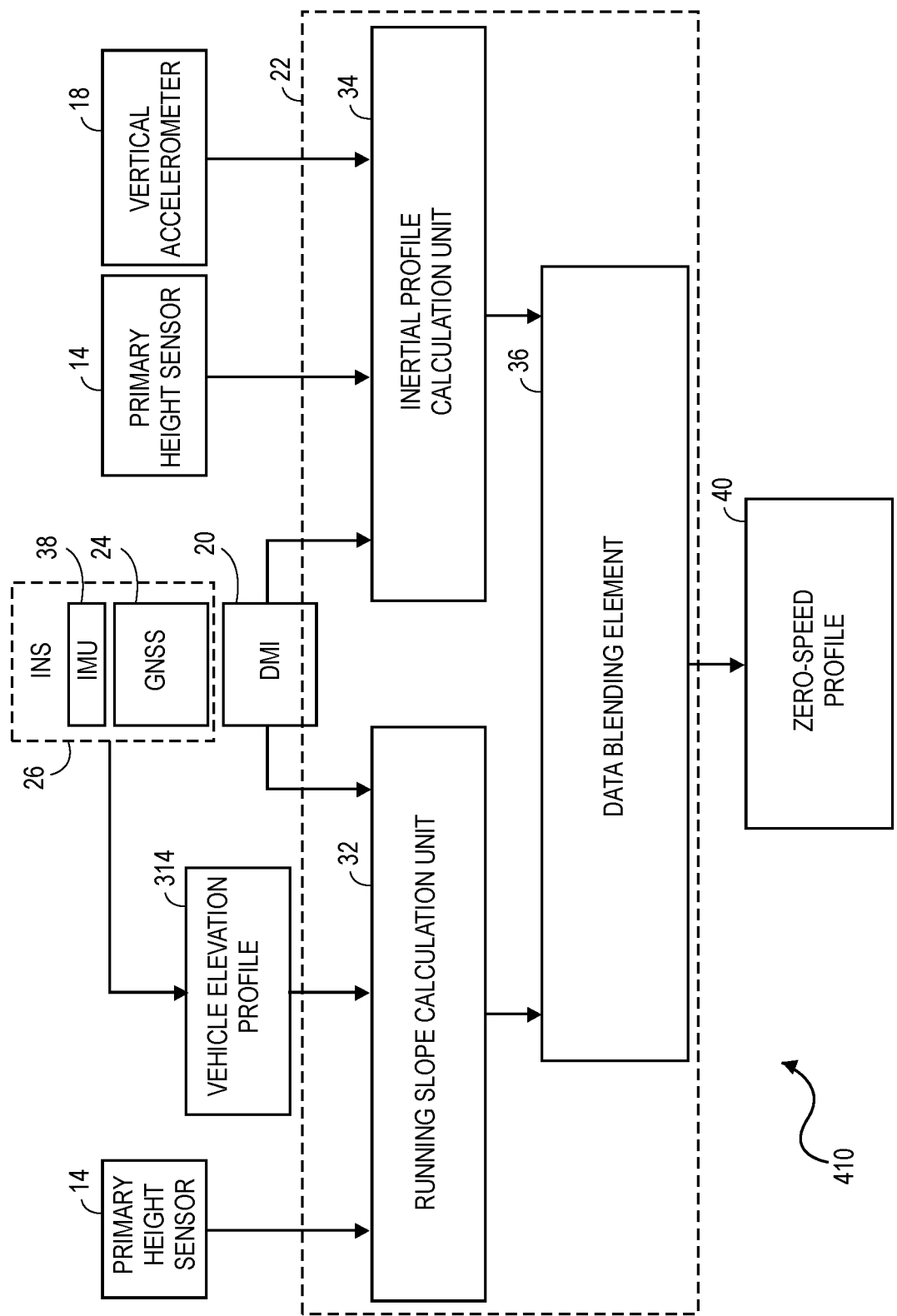
FIG. 10 is a logic diagram for generating a single-track zero-speed profile from combining INS data with inertial profiler data by utilizing data blending methods in accordance with the present invention.

Referring to FIG. 10, a flow diagram 410 for generating a zero-speed profile of a road surface traveled by the host vehicle 12 by blending inertial profile data and INS data is shown.

On the right side of the diagram, the inertial profile calculation unit 34 generates a time-based inertial elevation profile of the road surface traveled by the host vehicle 12, as discussed above, by receiving the inputs from the first height sensor 14, the vertical accelerometer 18 and the DMI 20. The inertial profile calculation unit 34 then double-integrates the vertical accelerometer sample data 18 on a time basis to get the time-based relative vehicle elevation profile. The data from the primary height sensor 14 is then added to the time-based relative vehicle elevation profile to obtain the time-based inertial profile.

On the left side of the diagram, the vehicle elevation profile 314 is generated as described above from either real-time processing or post-processing of the data from the INS 26 optionally with the DMI. Other forms of data from the INS 26 such as the vertical vehicle velocity or vertical vehicle acceleration can be used instead of absolute vehicle elevation by integrating or double-integrating respectively to get the vehicle elevation profile.

The running slope calculation unit 32 receives the vehicle elevation profile 314, height data from the primary height sensor 14 and the incremental longitudinal distance traveled by the host vehicle 12 as measured by the DMI 20. In response, the running slope calculation unit 32 generates an elevation profile of the surface traveled by the host vehicle 12 by:

1. Adding the height measurement data from the primary height sensor 14 to the vehicle elevation profile 314 obtained from the INS 26 to get a time-based surface elevation profile;
2. The surface elevation profile is then re-sampled to a distance-based profile and differentiated using a predetermined base length to obtain a distance-based slope profile. Again, the predetermined base length in one embodiment is 12 inches. In other embodiments, a longer or shorter base length may be used.
4. The running slope profile is then re-sampled from distance-based to time-based to create the time-based running slope data.

The inertial profile calculation unit 34 receives inputs from the first height sensor 14, the vertical accelerometer 18 and the DMI 20. The inertial profile calculation unit 34 double-integrates the vertical accelerometer sample data 18 on a time basis to get the time-based relative vehicle elevation profile. The data from the primary height sensor 14 is then added to the time-based relative vehicle elevation profile to obtain a time-based inertial elevation profile of the road surface traveled by the host vehicle 12.

The data blending element 36 is responsible for combining (a) the running slope data as generated by the running slope calculation unit 32 and (b) the inertial profile as generated by the inertial profile calculation unit 34. The running slope profile is generally less capable of measurements at shorter wavelengths. The distance between the two height sensors 14, 16 limits the capability of the running slope elevation profile to accurately measure any wavelength less than the distance (e.g., one foot for the embodiment described above). The running slope profile is, therefore, more accurate on longer wavelengths without profile drift. On the other hand, the inertial surface elevation profile tends to be more accurate at the shorter wavelengths, but tends to drift over longer wavelengths. The data blending element 36 therefore:

(1) Filters out inaccurate short wavelength components from the running slope data by applying a filter to obtain long wavelength running slope data;
(2) Re-samples the running slope data to the distance domain;
(3) Integrates the running slope distance-based data to obtain a distance-based running slope profile;
(4) Filters the inertial profile to remove long wavelength;
(5) Re-samples the inertial profile data to the distance domain; and
(6) Adds the long wavelength running slope profile to the short wavelength inertial profile.

The net result of the data blending is the generation of an accurate "zero-speed" profile 40 of the surface, regardless of the speed of the host vehicle. In other words, an accurate surface profile can be generated both (a) when there are vehicle stoppages, accelerations, and decelerations and (b) at very low speeds below a minimum speed, such as 5, 10 or 15 mph, as commonly required with prior art profilers, and (c) without any lead-in or lead-out distances.

In an alternate embodiment, the post processing vehicle elevation profile 314 can be combined with the primary height sensor 14 and then filtered on a time basis to remove the short wavelength components instead of converting to running slope profile. This can then be combined with the short wavelength inertial profile on a time basis and re-sampled to the distance domain to create the zero-speed profile.

In yet another alternate blending method, the vehicle elevation profile can be filtered by itself in the time domain to remove the short wavelength components. This long wavelength vehicle elevation profile can then be blended with the short wavelength components of the relative vehicle profile generated from the vertical accelerometer 18 to obtain a blended vehicle elevation profile. When adding on the primary height sensor data 14 to the resulting blended vehicle elevation profile and re-sampled to a distance basis, the result is an alternate method of obtaining the zero-speed profile. Other forms of data from the INS 26 such as the vertical vehicle velocity or vertical vehicle acceleration can be used instead of absolute vehicle elevation and combined with the vertical accelerometer 18 either in the acceleration domain or velocity domain respectively.

Projected Additional Track

Figure 11:
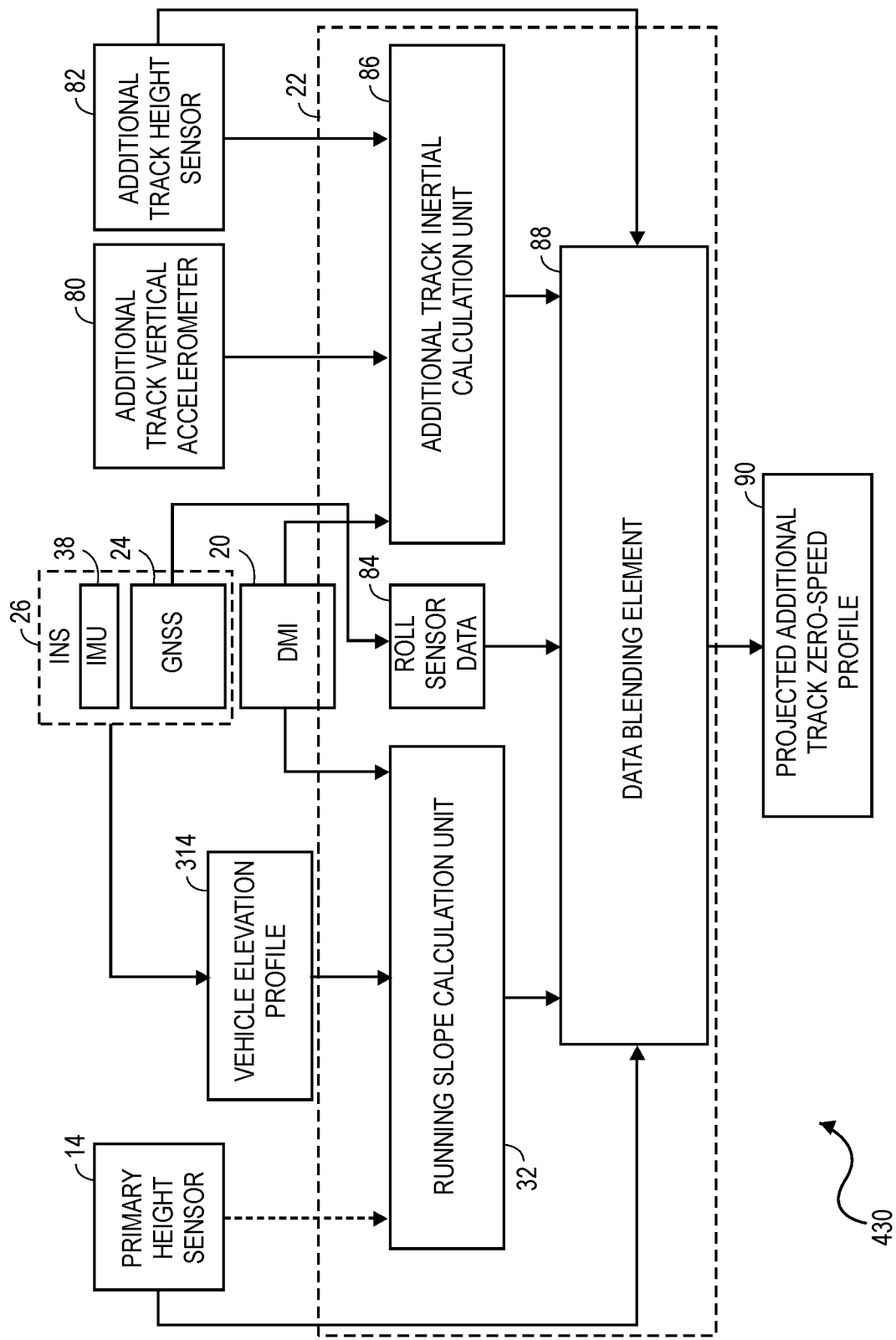
FIG. 11 is a logic diagram for generating an additional track's zero-speed profile from combining INS data and additional inertial profile data by utilizing data blending methods in accordance with the present invention.

Referring to FIG. 11, a block diagram 430 illustrating the addition of a projected track for blending INS data and an additional track in a manner similar to FIG. 10 is shown. With this embodiment, the left side of FIG. 11 is essentially the same as FIG. 10. On the right side, the following elements are provided, including an additional track vertical accelerometer 80, an additional track height sensor 82, and vehicle roll data 84 generated by the INS 26, an additional track inertial profile calculation unit 86, and a data blending element 88. The additional vertical accelerometer 80 and the additional track height sensor 82 are typically arranged longitudinally along the additional track of the host vehicle 12, opposite and parallel to the first or primary track.

The additional track inertial profile calculation unit 86 generates an inertial profile for the additional track from the additional track vertical accelerometer 80 and the additional track height sensor 82, similar to the inertial profile calculation unit 34 as already described. The data blending element 88, as described in more detail below with regard to FIG. 3B, blends the running slope data and inertial profile together, along with vehicle roll data 84, to generate a projected additional track zero-speed profile 90. As these elements were all previously described, a detailed explanation is not repeated herein for brevity.

Alternatively, the INS vehicle positions data can be translated using vehicle roll along with known x, y, and z offsets from the INS to the additional track's primary sensor to obtain the vehicle elevation profile at the additional track's location. This additional track's vehicle elevation profile can then be combined with the additional track's height sensor to be used for the running slope data of 32 in FIG. 10 where the additional track can essentially act as the primary track in FIG. 10 and the INS 26 location is merely translated to any additional track's location using x, y, and z offsets and attitude measurements of the INS 26. In which case the data blending can once again be done either using the running slope data or vehicle elevation data when combining with the inertial profile as stated previously.

Other Embodiments

Conventional profilers include so called reference profilers and inertial profilers. Reference profilers are devices typically used to collect reference longitudinal profiles for evaluating the accuracy of inertial profilers used for pavement construction quality control and quality assurance applications, as well as inertial profilers used for network surveys or pavement management applications. Reference profilers are typically "stand-alone" devices that have their own rigid frame and wheels, onto which various height, inclination and/or distance measuring devices are configured in a specific manner to support accurate longitudinal profile measurement. Reference profiler devices are typically manually propelled or can be motorized for operation at very low speeds. Inertial profilers are typically devices that are attached to a suspended host vehicle (i.e., a vehicle having a suspension system), such as a pickup truck, passenger car, golf cart or utility vehicle. Inertial profilers rely on one or more pairings of a primary height sensor and an accelerometer, in close proximity to each other, and a Distance Measurement Instrument (DMI), all of which are mounted onto the host vehicle.

The various embodiments described herein involve the attachment of instruments, such as the primary height sensor 14, the secondary height sensor 16, the vertical accelerometer 18, the Distance Measurement Instrument (DMI) 20, the main control unit 22, the Global Navigation Satellite System (GNSS) receiver 24, the Inertial Navigation System (INS) 26, and/or an Inertial Measurement Unit (IMU) onto a suspended host vehicle, such as a pickup truck, heavy construction vehicle, passenger car, a golf or similar self-propelled cart, etc. This approach differs from conventional reference profilers. Unlike reference profilers, in various embodiments of the present invention, the various measurement devices mentioned herein do not depend on a rigid frame, any particular wheel spacing or alignment, or any particular positioning of the measuring devices relative to the vehicle's frame or wheels. The measurement devices of the present invention can be mounted onto various exterior or interior components of a host vehicle, such as body panels, bumper assemblies, floor surfaces and/or frame, or the wheels of the host vehicle. In fact, at least several of the measurement devices are typically attached in a manner that is suspended from the frame of the host vehicle. It should be understood, however, that the various embodiments described herein are not precluded from being used with conventional profilers and/or the various instruments as listed herein directly mounted onto the rigid frame of a vehicle. On the contrary, some or all of the instruments as described herein can be implemented or otherwise mounted on any rigid frame or any part of a vehicle of any kind.

Conventional inertial profilers are typically not equipped to measure a spectrum of vehicle dynamics (such as pitch, roll, tilt and yaw, etc.); nor are conventional inertial profilers capable of compensating for a spectrum of vehicle dynamics, beyond vertical acceleration, when generating road surface profiles. As a result, conventional inertial profilers have well known limitations, including a minimum operating speed threshold, minimum acceleration and deceleration rates of the host vehicle, and required lead-in and lead-out distances. In contrast, the various embodiments of the present invention add various measurement devices, including a secondary height sensor, a Global Navigation Satellite System (GNSS) receiver 24, an Inertial Navigation System (INS) and/or an Inertial Measurement Unit (IMU). With the present invention, INS, GNSS and/or IMU data is among the instrumentation used to measure and compensate for vehicle dynamics when generating road surface profiles. The additional measuring devices and methodology of the present invention generate accurate and repeatable road surface profiles, with no vehicle speed threshold and without lead-in or lead-out distances.

It is further noted that although the host vehicle 12 is depicted as a pick-up truck, again by no means is this a requirement. On the contrary, the host vehicle 12 can be any type of vehicle that is either motorized or non-motorized. For example, the host vehicle can be a common passenger car, a heavy piece of construction equipment, a cart such as a golf cart, or even a non-motorized vehicle such as a frame that is either pushed and/or pulled by a human operator or another vehicle. As such, the term vehicle as used herein should be widely construed as any device or apparatus capable of rolling or otherwise moving across a surface and supporting the various components and instruments of the profiler system 10 as described herein.

In yet other embodiments, the sampling interval for collecting data samples is once every millisecond. It should be understood that this sampling interval is merely exemplary and a wide range of sampling intervals may be used, including more or less frequent than once every millisecond. Data can also be collected at a distance-based sample interval, such as every inch, rather than a time-based sample interval.

Although only a few embodiments have been described in detail, it should be appreciated that the present application may be implemented in many other forms without departing from the spirit or scope of the disclosure provided herein. Therefore, the present embodiments should be considered illustrative and not restrictive and is not to be limited to the details given herein, but may be modified within the scope and equivalents of the appended claims.

What is claimed is:

1. A profiling system configured to be used in cooperation with a vehicle, the profiling system configured to:
   generate a vehicle elevation profile using one or more multi-axis dynamic motion sensors, the one or more multi-axis dynamic motion sensors configured to generate information indicative of the dynamics of the vehicle in multiple axes as the vehicle travels a road surface or is stopped on the road surface;
   receive data samples from a height sensor on the vehicle as the vehicle travels the road surface or is stopped on the road surface; and
   generate a surface profile of the road surface traveled by, or adjacent to, the vehicle by using one or more data processors to process the vehicle elevation profile and the data samples from the height sensor,
   the surface profile of the road surface generated during one or more of:
      (a) stoppages of the vehicle;
      (b) accelerations of the vehicle from a stop or slow speed, or
      (c) decelerations of the vehicle to a stop or the slow speed,
   wherein the slow speed is designated as 15 mile per hour or less.

2. The profiling system of claim 1, wherein the one or more data processors are configured to receive inputs from:
   the height sensor that measures relative height of the vehicle to the road surface as the vehicle travels the road surface or is stopped on the road surface;
   a vehicle elevation profile processor that generates the vehicle elevation profile; and
   a distance measurement instrument (DMI) that measures the travel of the vehicle over the road surface.

3. The profiling system of claim 1, wherein at least one of the one or more multi-axis dynamic motion sensors is or includes an Inertial Measurement Unit (IMU).

4. The profiling system of claim 1, wherein at least one of the one or more multi-axis dynamic motion sensors is or includes a Global Navigation Satellite System (GNSS).

5. The profiling system of claim 1, wherein at least one of the one or more multi-axis dynamic motion sensors is or includes an Inertial Navigation System (INS).

6. The profiling system of claim 1, further comprising a vehicle elevation profile processor that generates the vehicle elevation profile from information received from one of the following:
   (d) a Global Navigation Satellite System (GNSS) unit;
   (e) an Inertial Measurement Unit (IMU);
   (f) a Distance Measurement Instrument (DMI),
   (g) one or more accelerometer(s),
   (h) one or more gyroscope(s); or
   (i) any combination of (d) through (h).

7. The profiling system of claim 1, wherein the information indicative of the dynamics of the vehicle generated by the one or more multi-axis dynamic motion sensors as the vehicle travels the road surface or is stopped on the road surface is derived from one of the following:
- (d) relative position information of the vehicle in any of X, Y and Z directions;
- (e) absolute position information of the vehicle in any of the X, Y and Z directions;
- (f) acceleration information of the vehicle in any of the X, Y and Z directions;
- (g) velocity information of the vehicle in any of the X, Y and Z directions;
- (h) any of pitch, yaw, and roll information of the vehicle;
- (i) rotational rate of the vehicle about any of the X, Y or Z directions; and
- (j) any combination of (d) through (i).

8. The profiling system of claim 1, wherein the one or more data processors are configured to generate the valid surface profile using Kalman filtering.

9. The profiling system of claim 1, wherein the one or more data processors are configured to generate the vehicle elevation profile using Kalman filtering.

10. The profiling system of claim 1, wherein the one or more data processors are configured to generate the surface profile by processing or incorporating the data samples from the height sensor and the vehicle elevation profile using Kalman filtering.

11. The profiling system of claim 1, wherein the vehicle elevation profile is generated by an Inertial Navigation System (INS) or a Global Navigation Satellite System (GNSS) that includes or receives information from the one or more multi-axis dynamic motion sensors.

12. The profiling system of claim 11, wherein the INS or GNSS is further configured to receive correction information from one or more base stations.

13. The profiling system of claim 12, wherein the one or more base stations is/are included in one of the following:
- (d) a Differential Global Positioning System (DGPS);
- (e) a Differential Global Navigation Satellite Systems (DGNSS);
- (f) a Satellite Based Augmentation System (SBAS);
- (g) a Wide Area Augmentation System (WAAS); or
- (h) any other method of receiving Global Navigation Satellite System (GNSS) correction information.

14. The profiling system of claim 1, wherein the one or more data processors are further configured to re-sample the data samples received from the height sensor on a distance basis using distance information received from a Distance Measuring Instrument (DMI).

15. The profiling system of claim 1, wherein the one or more data processors is/are further configured to generate the surface profile of the road surface without one of:
- (d) a minimum speed requirement for the vehicle,
- (e) a lead-in distance at a start of the surface profile,
- (f) a lead-out distance at an end of the surface profile;
- (g) the vehicle traveling in forward or reverse directions; or
- (h) any combination of (d) through (g).

16. The profiling system of claim 1, wherein the one or more data processors are configured to generate the vehicle elevation profile using Kalman filtering to combine data from one or more of:
- (d) a Global Navigation Satellite System (GNSS);
- (e) an Inertial Measurement Unit (IMU);
- (f) a Distance Measurement Instrument (DMI);
- (g) one or more accelerometer(s);
- (h) one or more gyroscope(s); or
- (i) any combination of (d) through (h).

17. The profiling system of claim 1, wherein the one or more data processors are configured to generate the surface profile using Kalman filtering to combine data from one or more of:
- (d) a Global Navigation Satellite System (GNSS);
- (e) an Inertial Measurement Unit (IMU);
- (f) a Distance Measurement Instrument (DMI);
- (g) one or more accelerometer(s);
- (h) one or more gyroscope(s);
- (i) one or more height sensor(s); or
- (j) any combination of (d) through (h).

18. The profiling system of claim 1, wherein the one or more data processors are configured to generate the vehicle elevation profile or the surface profile using one of the following:
- (d) Kalman filters;
- (e) a high-pass filter and a low-pass filter;
- (f) complementary low pass and high pass filters;
- (g) complementary filters; or
- (h) any other filter or filters.

19. The profiling system of claim 1, wherein the surface profile of the road surface is also generated when the vehicle is traveling over the slow speed.

20. The profiling system of claim 1, wherein at least one of the one or more multi-axis dynamic motion sensors is or includes an accelerometer.

21. The profiling system of claim 1, wherein at least one of the one or more multi-axis dynamic motion sensors is or includes a gyroscope.

22. The profiling system of claim 1, wherein the vehicle elevation profile is generated relative to the road surface.

23. The profiling system of claim 1, wherein the one or more multi-axis dynamic motion sensors are mounted on any of an exterior surface of the vehicle, an interior surface of the vehicle, a body panel of the vehicle, a bumper of the vehicle, one or more wheels of the vehicle, or a frame of the vehicle and the vehicle elevation profile is generated relative to the frame of the vehicle.

24. The profiling system of claim 1, wherein the one or more data processors processing the vehicle elevation profile and the data samples from the height sensor to compensate for vehicle dynamics when generating the road surface profile.

25. The profiling system of claim 1, wherein the surface profile is valid because it is accurate and repeatable.

26. The profiling system of claim 25, wherein the surface profile is valid regardless of the speed of the vehicle, during either accelerations or decelerations of the vehicle, and without any lead-in or lead-out distances.

* * * * *